US012491455B2

United States Patent
Ekholm et al.

(10) Patent No.: US 12,491,455 B2
(45) Date of Patent: Dec. 9, 2025

(54) ADVANCED PASSIVE WEDGE WIRE SCREEN INTAKE

(71) Applicant: Johnson Screens, Inc., New Brighton, MN (US)

(72) Inventors: Michael R. Ekholm, Minneapolis, MN (US); Daryn Bertelson, New Brighton, MN (US); Spencer Buss, New Brighton, MN (US); Klaus Heil, New Brighton, MN (US); Nadine Lacrosse, New Brighton, MN (US); Darrin Lindblom, New Brighton, MN (US); Ehrich Shaw, New Brighton, MN (US); Mark Watson, New Brighton, MN (US)

(73) Assignee: Johnson Screens, Inc., New Brighton, MN (US)

( * ) Notice: Subject to any disclaimer, the term of this patent is extended or adjusted under 35 U.S.C. 154(b) by 0 days.

(21) Appl. No.: 17/962,402

(22) Filed: Oct. 7, 2022

(65) Prior Publication Data

US 2023/0103787 A1    Apr. 6, 2023

Related U.S. Application Data

(63) Continuation of application No. 17/047,036, filed as application No. PCT/US2019/027149 on Apr. 12, 2019, now abandoned.
(Continued)

(51) Int. Cl.
*B01D 25/24* (2006.01)
*B01D 29/19* (2006.01)

(52) U.S. Cl.
CPC ............. *B01D 25/24* (2013.01); *B01D 29/19* (2013.01)

(58) Field of Classification Search
CPC ........ B01D 29/19; B01D 29/72; B01D 29/54; B01D 29/445; B01D 29/48; B01D 35/02;
(Continued)

(56) References Cited

U.S. PATENT DOCUMENTS

| 2,512,394 | A |   | 6/1950 | Sullivan |            |
|-----------|---|---|--------|----------|------------|
| 2,674,376 | A | * | 4/1954 | Swan     | B01D 29/114 |
|           |   |   |        |          | 210/435    |

(Continued)

FOREIGN PATENT DOCUMENTS

| CN | 107715588 A  | 2/2018 |
| JP | 2012-112238  | 6/2012 |

(Continued)

OTHER PUBLICATIONS

PCT International Search Report for PCT/US2019/027149, mailed Aug. 7, 2019, 2 pages.
(Continued)

*Primary Examiner* — Benjamin M Kurtz
(74) *Attorney, Agent, or Firm* — Husch Blackwell

(57) ABSTRACT

Screen intake assemblies and related methods of fabrication and operation that improve both operational performance and structural strength. The screen intake assembly can include one or more screen portions that run substantially and continually along the length of the screen assembly to provide increase fluid intake and uniform flow. The screen intake assembly can comprise a central manifold having an exterior manifold screen portion to provide additional filtering capacity. The screen intake assembly can be used alone or in combination with internal flow modifier structures to increase fluid intake and uniformity. Internal flow modifiers can include a perforated flow modifier pipe, an internal flow modifier pipe, and/or converging flow modi-
(Continued)

fiers. The screen intake assembly can include cleaning systems that operate continuously or on demand.

20 Claims, 27 Drawing Sheets

Related U.S. Application Data

(60) Provisional application No. 62/656,706, filed on Apr. 12, 2018.

(58) Field of Classification Search
CPC ......... B01D 35/0273; E03B 7/07; E03B 3/04; E02B 5/08
See application file for complete search history.

(56) References Cited

U.S. PATENT DOCUMENTS

| | | |
|---|---|---|
| 2,754,003 A | 7/1956 | Fenner |
| 3,015,224 A | 1/1962 | Oles |
| 3,332,259 A | 7/1967 | Zylstra |
| 3,429,444 A | 2/1969 | Spiegel |
| 4,045,351 A | 8/1977 | Peterson |
| 4,578,186 A * | 3/1986 | Morin ................... B01D 29/72 210/167.13 |
| 5,545,318 A * | 8/1996 | Richmond ............. B01D 29/15 210/232 |
| 5,820,751 A | 10/1998 | Faircloth, Jr. |
| 5,935,439 A * | 8/1999 | Hart ....................... B01D 29/33 210/416.1 |
| 6,051,131 A * | 4/2000 | Maxson ................... E02B 5/08 210/162 |
| 6,663,774 B2 | 12/2003 | Flansburg et al. |
| 7,425,264 B2 | 9/2008 | Reig |
| 7,575,677 B1 * | 8/2009 | Barnes .................. B01D 29/111 210/172.3 |
| 9,399,858 B2 | 7/2016 | Maxson et al. |
| 2003/0029780 A1 | 2/2003 | Ekholm et al. |
| 2005/0241282 A1 * | 11/2005 | Gordon .................. B01D 46/72 55/302 |
| 2006/0078387 A1 | 4/2006 | Allard et al. |
| 2007/0175384 A1 | 8/2007 | Bruderl et al. |
| 2012/0055869 A1 | 3/2012 | Gardiner et al. |
| 2012/0298572 A1 * | 11/2012 | Ekholm ............. B01D 35/1576 210/340 |
| 2013/0048551 A1 * | 2/2013 | Maxson ................... E03B 3/04 210/323.2 |
| 2013/0206706 A1 * | 8/2013 | Ekholm ................. B01D 29/68 210/97 |
| 2015/0021249 A1 | 1/2015 | Watson |

FOREIGN PATENT DOCUMENTS

| | | |
|---|---|---|
| JP | 2012246752 | 12/2012 |
| WO | WO 98.16297 A1 | 4/1998 |

OTHER PUBLICATIONS

PCT Written Opinion of the ISA for PCT/US2019/027149, mailed Aug. 7, 2019, 8 pages.

Application and File History for U.S. Appl. No. 17/047,036, filed Oct. 12, 2020. Inventors Michael R. Ekholm et al.

Japanese Office Action with English Translation for Application No. 2020-555378, dated Nov. 25, 2022, 7 pages.

* cited by examiner

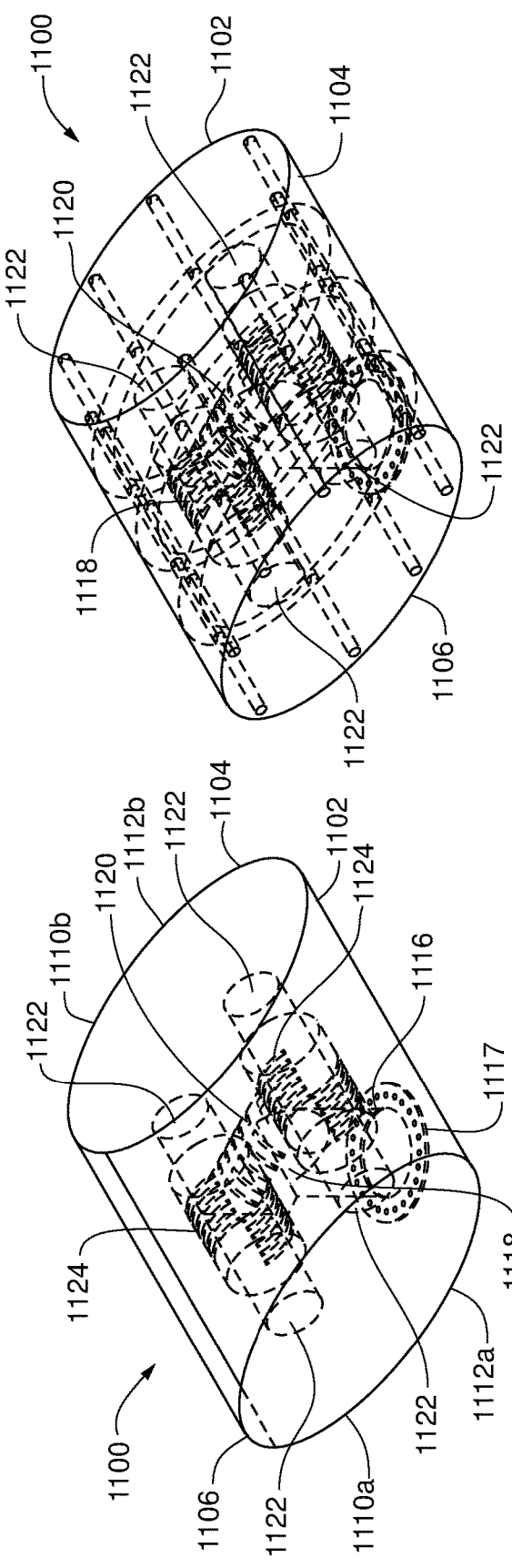
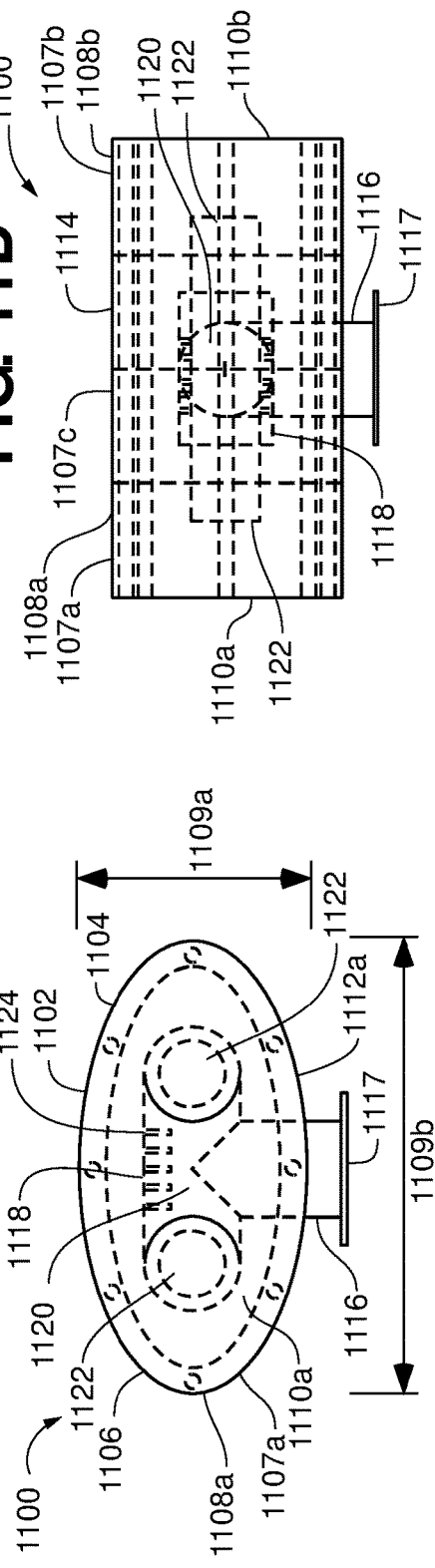
FIG. 11A
FIG. 11B
FIG. 11C
FIG. 11D

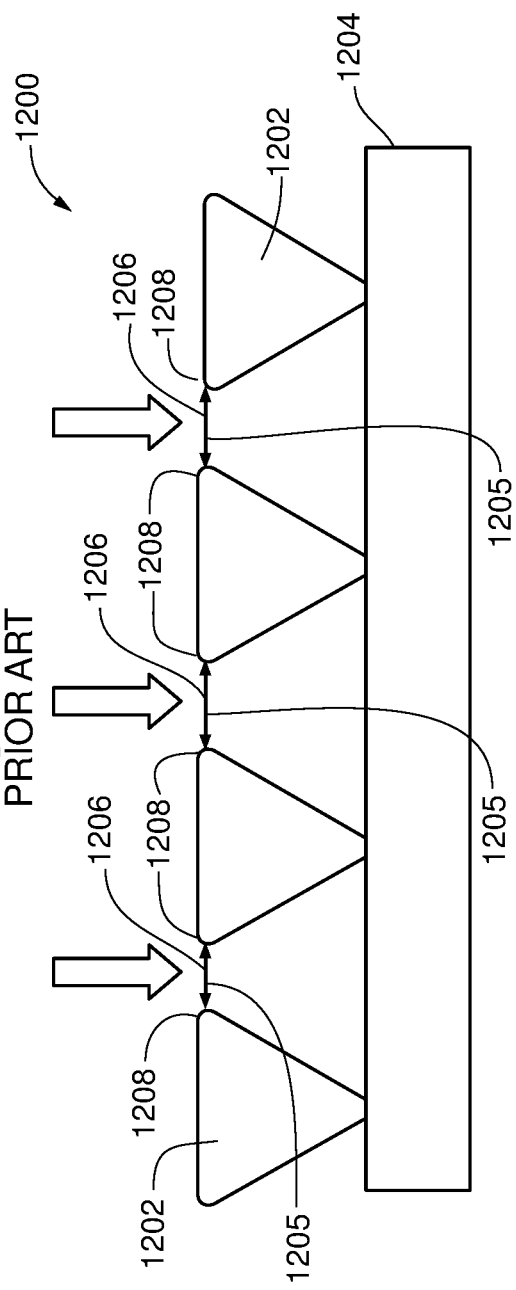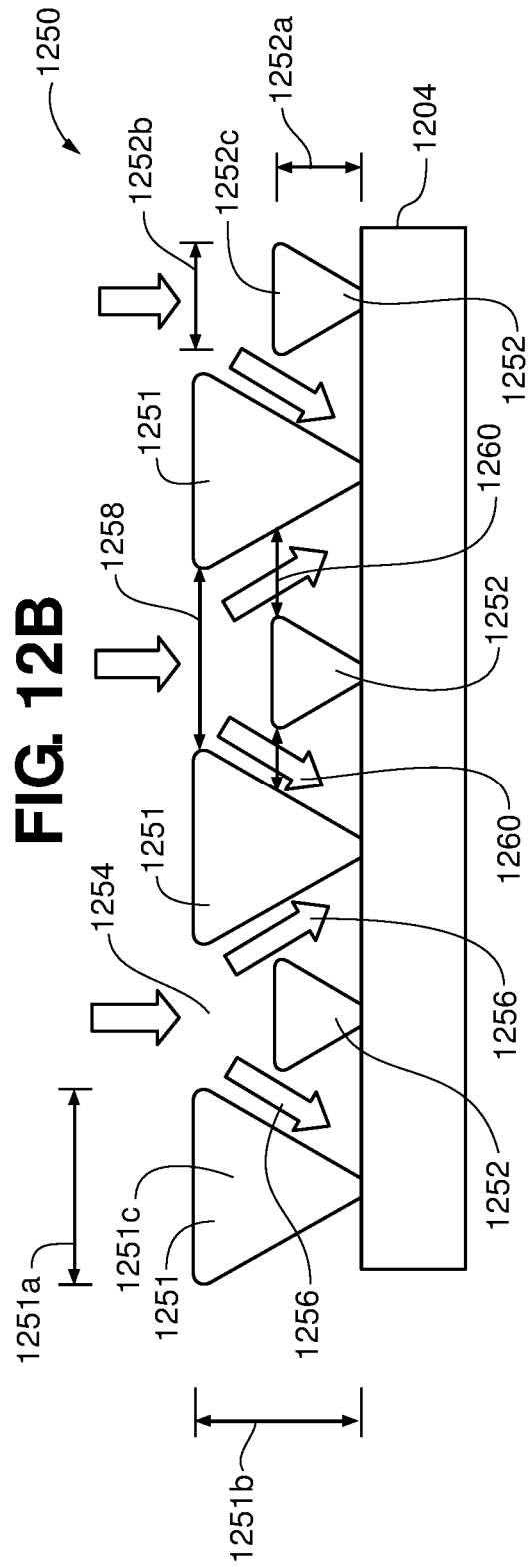

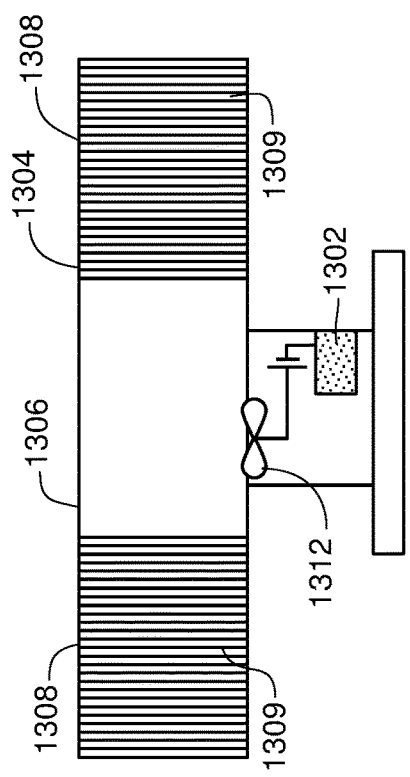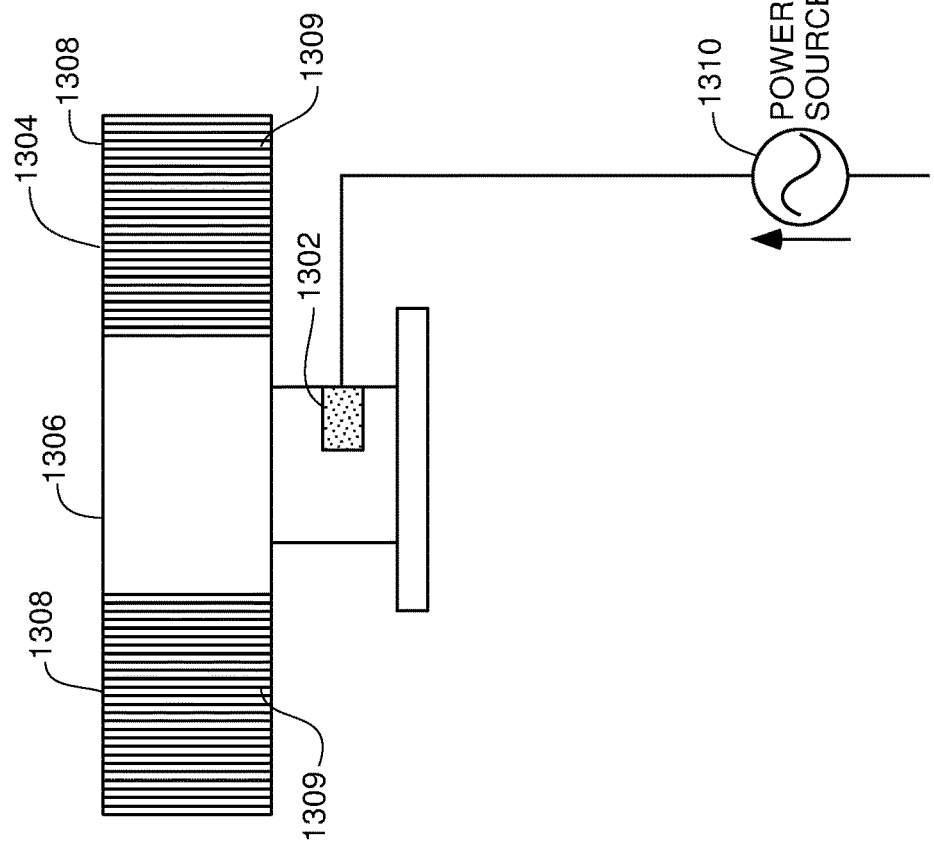

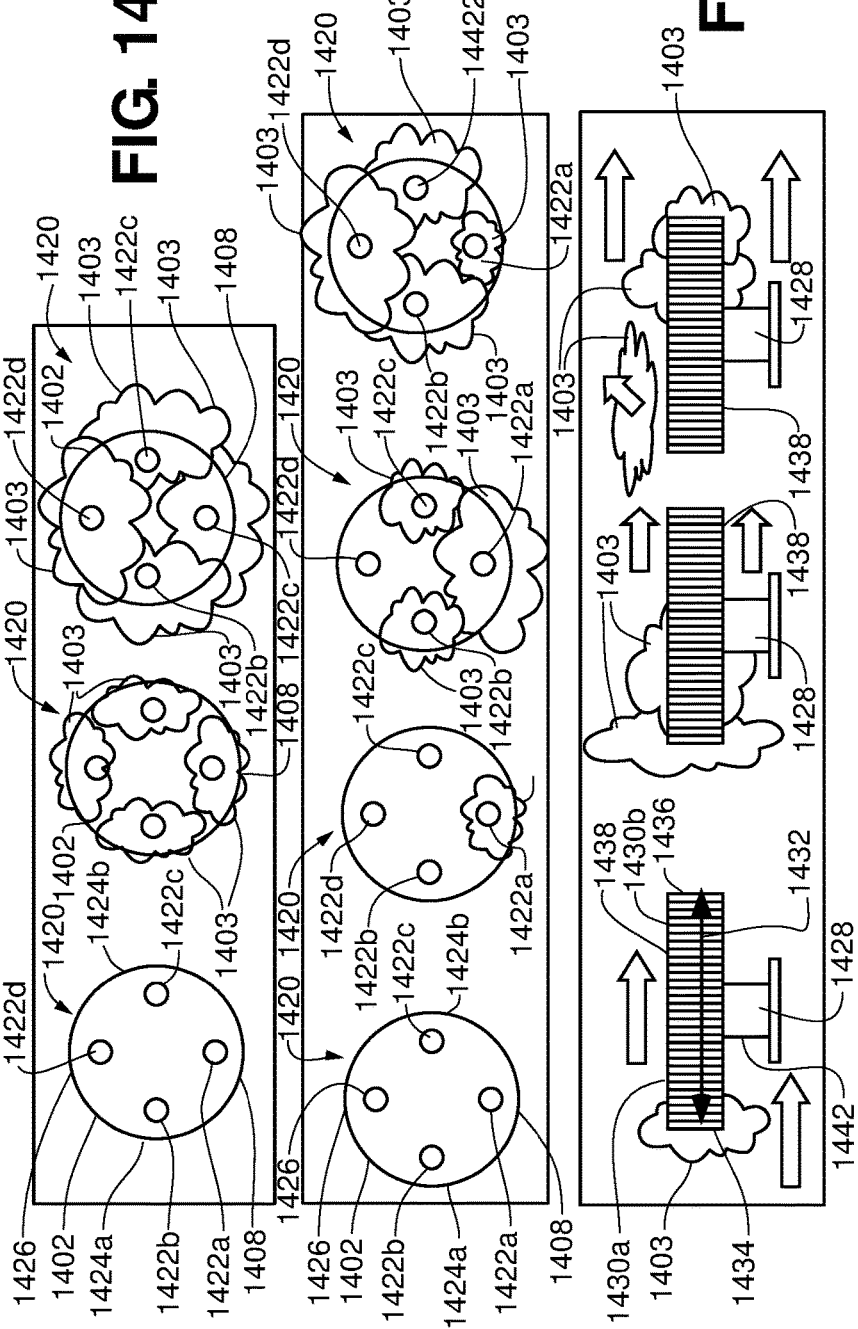

ADVANCED PASSIVE WEDGE WIRE SCREEN INTAKE

RELATED APPLICATIONS

This application is continuation of application Ser. No. 17/047,036, filed Oct. 12, 2020, which is a National Phase entry of PCT Application No. PCT/US2019/027149 filed Apr. 12, 2019, which application claims the benefit of priority to U.S. Application No. 62/656,706, filed Apr. 12, 2019, the entire disclosures of which are incorporated herein by reference.

FIELD OF THE INVENTION

The present invention is directed to screen intakes for filtering incoming water from a water source. More specifically, the present invention is directed to screen intakes and related methods that provide for increased intake capacities and improved performance.

BACKGROUND

Water collection systems are typically used to provide water to end users such as manufacturing plants, cities, irrigation systems, and power generation facilities located adjacent a body of water such as a river, lake, or salt water bodies. The end users may employ this type of system as an alternative to drilling water wells or buying water directly from a municipal source. Additionally, use of these systems may be determined by the location of the end user, for example remote locations where water from a municipal source and/or electrical power to operate pumps is not readily available. These water collection systems are advantageous in that they can be operated efficiently and economically with an ability to adapt to varying water and environmental conditions.

Conventional water collection systems typically use an inlet pipe that is adapted to transport water from a position submerged in a body of water to an end user located adjacent to or proximate the body of water. An inlet pipe is generally submerged in the body of water and the end of the inlet pipe is typically coupled to an intake screen assembly that defines one or more filtering members. One common intake screen configuration is a Tee-style configuration having two filtering screens on opposing ends. A typical construction for large intake screen assemblies is a flanged tee section with two screen cylinders that are cantilevered from opposite ends of the tee section, and with solid closures such as flat plates, cones, or dished heads on the distal ends of each screen cylinder. These closures can be removable, or include access portals within their design. The separate components of the assemblies are usually welded together.

Regardless of the specific configuration, the screen intakes are generally configured to prevent waterborne debris of a certain size, from entering the inlet pipe. At the same time, the screen intakes must be designed to protect aquatic life while filtering debris along the length of the intake screen surfaces. To do this, the flow velocity through the screens should be kept below a maximum peal level, which may be about 0.5 f/s or other limits that are defined by local requirements and/or specifications. One way to reduce the flow resistance and control the flow velocity at the screen's surface is to use flow modifiers inside the screen intake. For example, the Johnson Screens® brand of screen intakes improves flow uniformity across the filtering screens using flow modifiers as disclosed in U.S. Pat. No. 6,051,131 and U.S. Patent Publication 2012/0298572, the disclosures of each being incorporated herein by reference in their entirety.

In addition to designs that are optimized for flow performance, screen intake design must also take into account external forces such as, for example, environmental conditions such as ice formation as well as potential impact loads when the screen intakes are located at their submerged collection locations. As such, it would be advantages to improve upon conventional screen intake designs so as to not only increase flow performance within and across a screen intake but to also increase the structural strength of the screen intake so as to better resist external pressures and impact loads.

SUMMARY

Embodiments disclosed herein include a screen intake assembly having a central manifold for the attachment of individual screen portions and internal flow modifiers. In some embodiments, the central manifold can include a central screen portions such that an entire intake assembly length includes an external screen for increasing a fluid intake capacity of the screen intake assembly. The screen intake assembly can comprise individual screen sections that are selectively attached to the central manifold such that the fluid intake capacity of the screen intake assembly can be selectively adjusted. In some embodiments, the screen sections and central manifold can be adjacently assembled utilizing an external connection, such as, for example, an external flange wall to facilitate assembly at point of use. In some embodiments, the internal flow modifiers can be operably coupled to the central manifold to selectively influence fluid flow characteristics within the screen intake assembly. The internal flow modifiers can be comprised of individual flow modifier sections that allow the internal flow modifier to be expanded to accommodate the number of screen portions attached to the central manifold.

In general, the embodiments of the present invention can comprise an adjustable or expandable screen intake assembly that can utilize a central manifold screen section, individual screen sections, a central flow modifier and individual flow modifier sections to adjust fluid intake characteristics including, for example, flow capacity, pressure drop, screen utilization, and the avoidance of turbulent flow conditions within the screen intake assembly. In addition, screen intake assemblies of the preset invention can include integral cleaning assemblies that serve to remove particulates and biofouling.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 11A is a partially hidden, perspective view of a screen intake assembly according to a representative embodiment of the present invention.

FIG. 11B is a partially hidden, perspective view of the screen intake assembly of FIG. 11A.

FIG. 11C is a partially hidden, end view of the screen intake assembly of FIG. 11A.

FIG. 11D is a partially hidden, side view of the screen intake assembly of FIG. 11A.

FIG. 12A is a section view of a screen filter according to an embodiment of the prior art.

FIG. 12B is a section view of a screen filter according to an embodiment of the present invention.

FIG. 13A is a side view of a screen intake assembly according to an embodiment of the present invention.

FIG. 13B is a side view of a screen intake assembly according to an embodiment of the present invention.

FIG. 14A is an end view of an air burst system for use with a screen intake assembly according to the prior art.

FIG. 14B is an end view of an air burst system for use with a screen intake assembly according an embodiment of the present invention.

FIG. 14C is an end view of an air burst system for use with a screen intake assembly according an embodiment of the present invention.

FIG. 14D is a side view of an air burst system for use with a screen intake assembly according an embodiment of the present invention.

Figure 1:
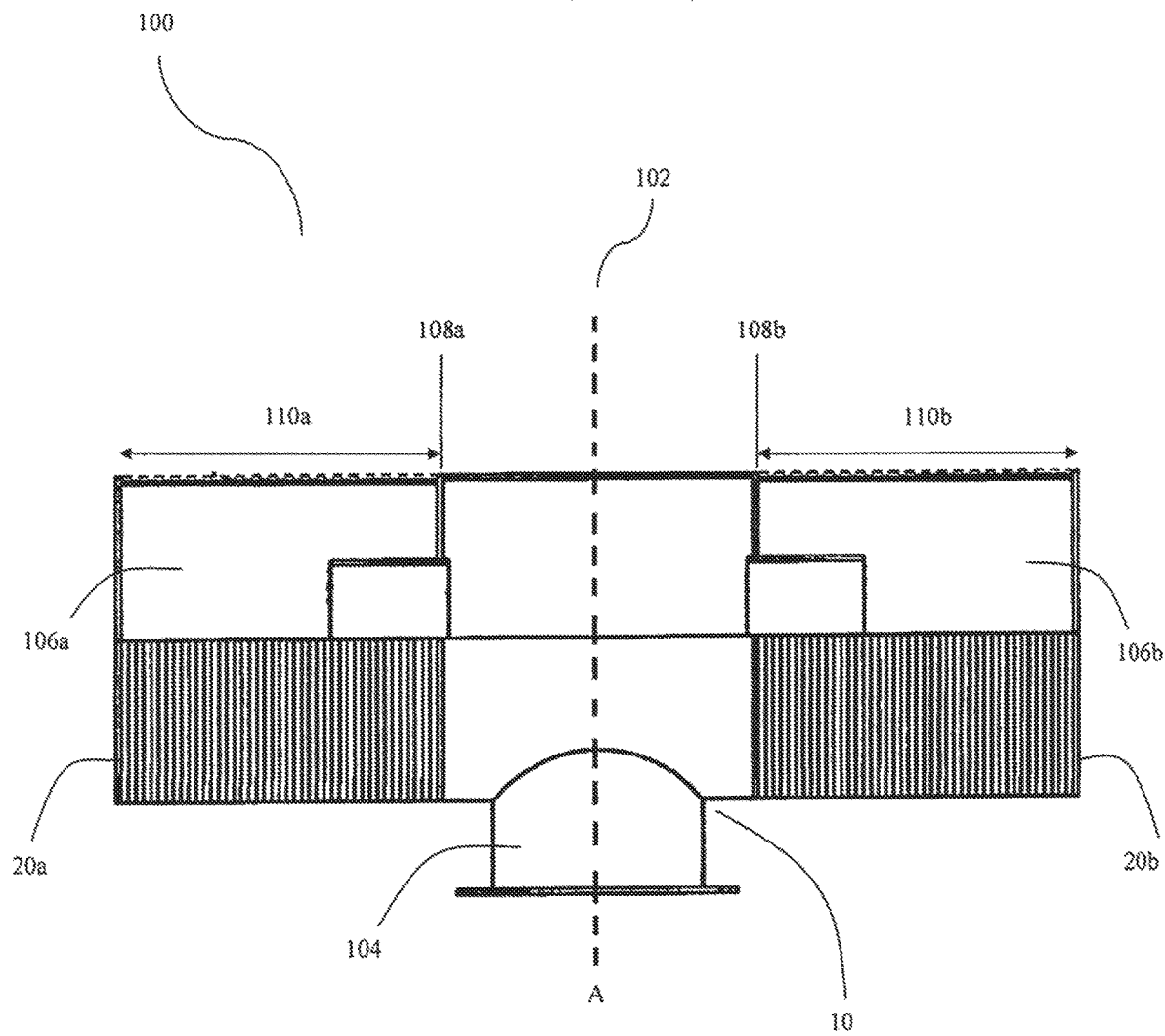
FIG. 1 is a partially hidden section view of a screen intake assembly of the prior art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 illustrates a conventional intake screen assembly 100 of the prior art. An intake screen assembly 100 can generally comprise an intake member or other body shown in the form of a central, flanged tee-section 10, one or more closure members shown as end plates 20a, 20b, a center manifold 102, a lower portion 104, one or more screen portions 106a, 106b, and one or more manifold walls 108a, 108b. In embodiments, the approximate center of screen intake assembly 100 is shown along axis A. Center manifold 102 extends substantially and continually from axis A to manifold wall 108a and 108b, and is comprised of a material that does not allow fluid intake or inflow, such as stainless steel or copper-nickel pipe or tubing. Screen portions 106a, 106b each have a corresponding screen length 110a, 110b that is defined between the respective manifold wall 108a, 108b to the respective end plate 20a, 20b. Screen portions 106a, 106b can each comprise approximately one-third of the total length of screen intake assembly 100. Screen intake assembly 100 can also comprise flow modifiers, various embodiments of which are disclosed herein.

As seen in FIGS. 2A-2F, a screen intake assembly 200 of the present invention can substantially resemble an overall shape of screen intake assembly 100 but wherein the central manifold 102 has been replaced with a central portion 202 including screen elements to increase the available filtering area, filtering capacity, flow uniformity and efficiency. Screen intake assembly 200 comprises an intake member or other body shown in the form of a central, flanged tee-section 214, a pair of closure members shown as end plates 212a, 212b, the central portion 202, a lower portion 204, screen portions 206a, 206b, and one or more manifold walls 208a, 208b. In embodiments, manifold wall 208a, 208b is positioned at the approximate center of screen intake assembly 200, which is shown along axis A. Each screen portion 206a, 206b has a screen length 210a, 210b defined between the corresponding manifold wall 208a, 208b, or manifold side when only a single manifold wall is utilized, and the corresponding end plate member 212a, 212b. Screen portion 206a, 206b extends continually and substantially from axis A to end closure 212a, 212b. Each screen portion 206a, 206b can comprise approximately one-half the entire length of the screen intake assembly 200.

Figure 2A:
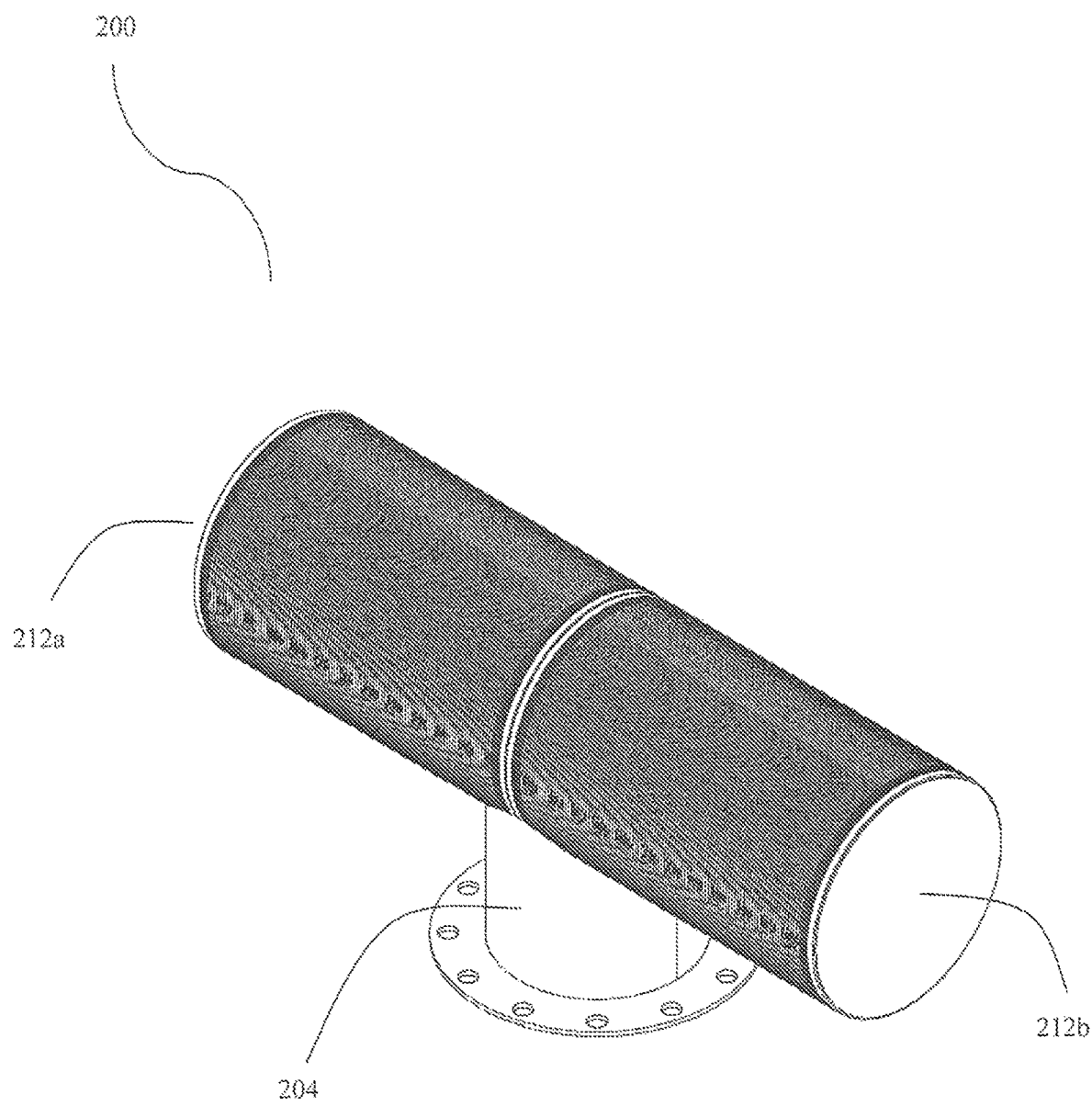
FIG. 2A is a perspective view of a screen intake assembly according to an embodiment of the present invention.
Figure 2B:
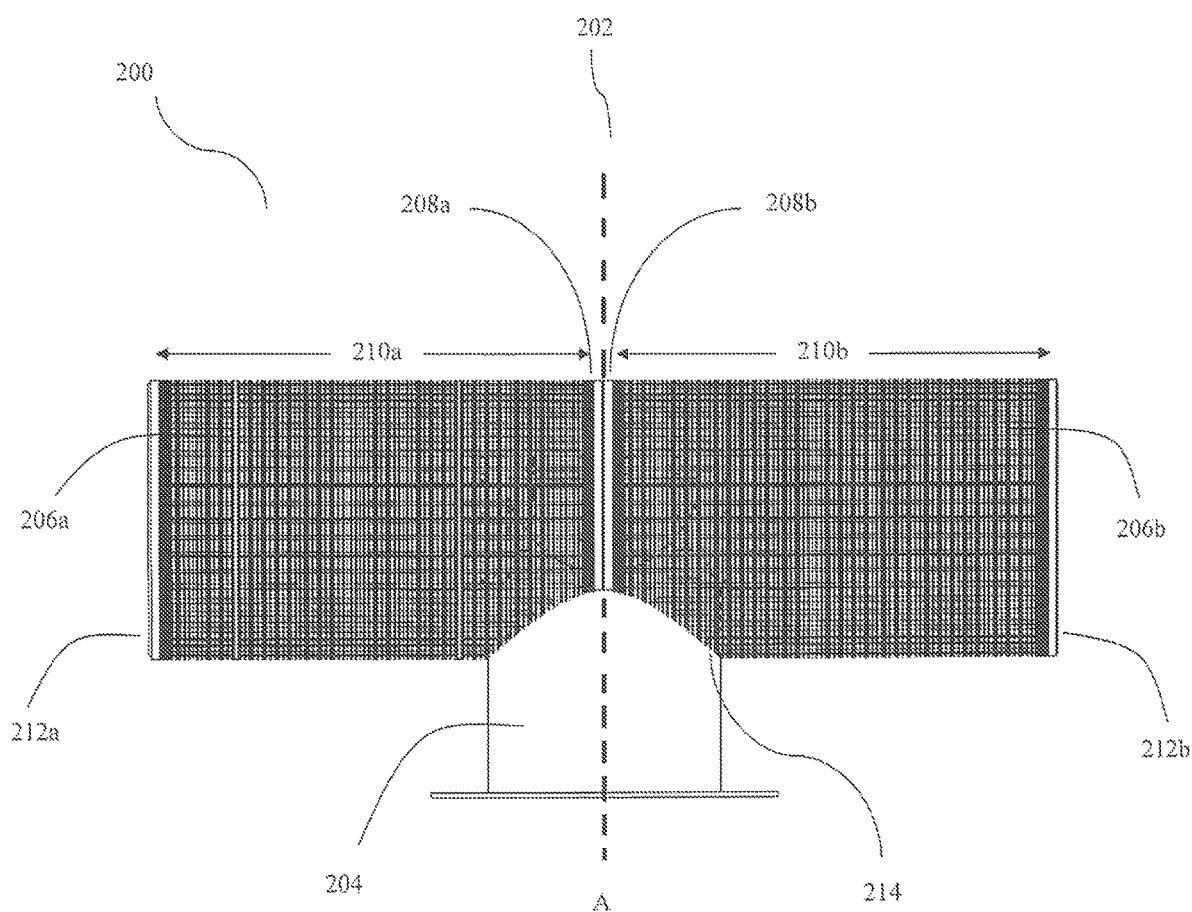
FIG. 2B is a front view of the screen intake assembly of FIG. 2A.
Figure 2C:
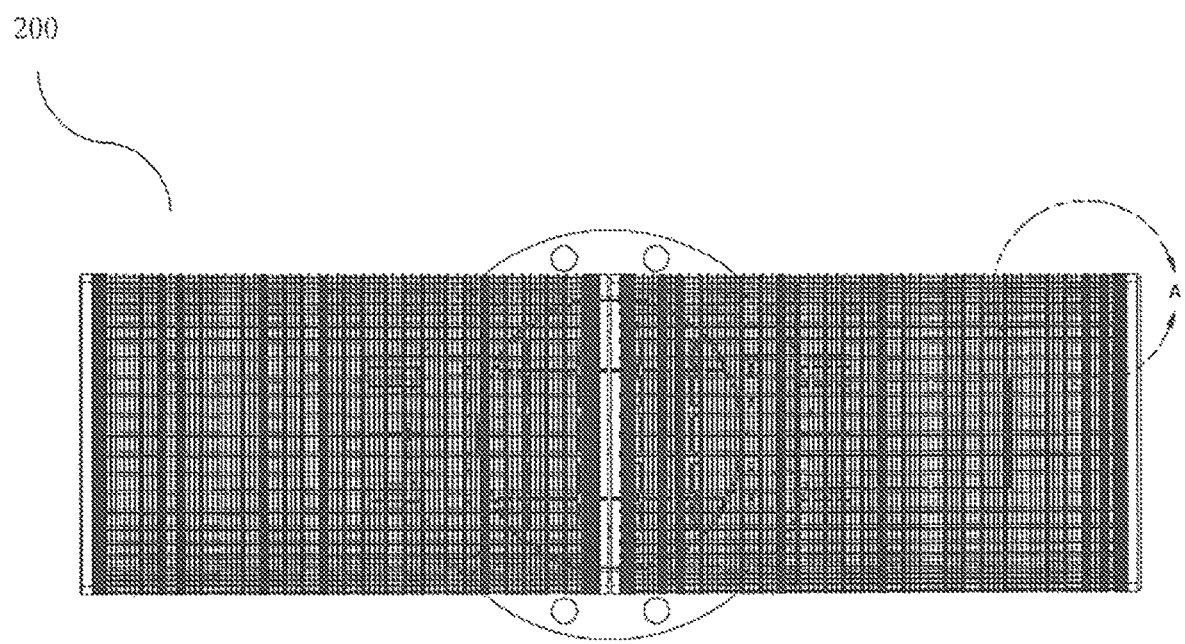
FIG. 2C is a top view of the screen intake assembly of FIG. 2A.
Figure 2E:
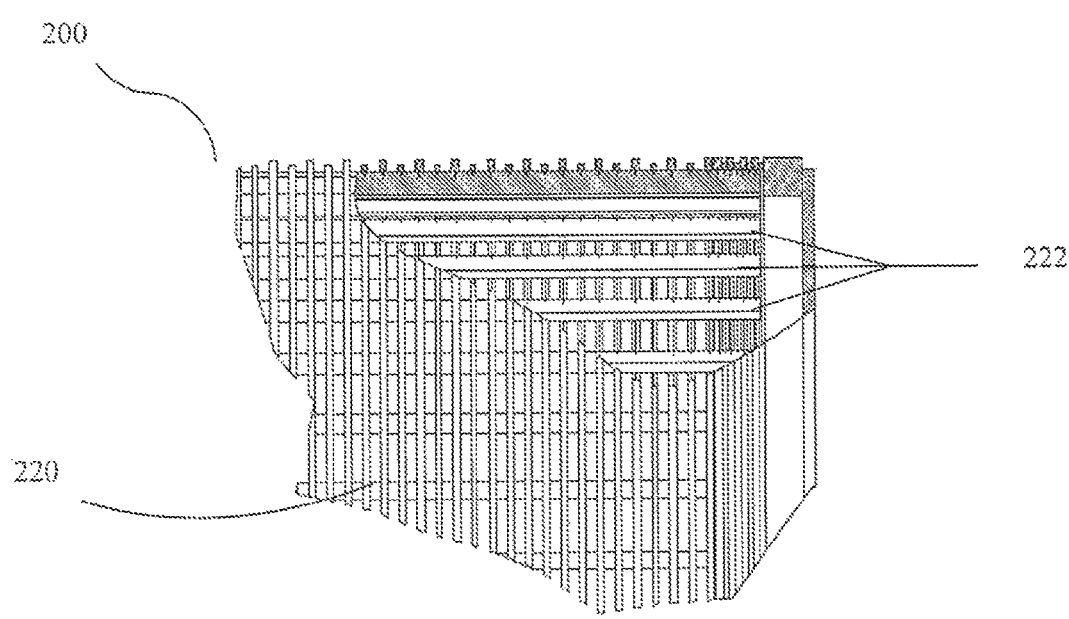
FIG. 2E is a partially hidden, section view of the screen intake assembly of FIG. 2A taken at Detail A of FIG. 2C depicting an internal support structure according to a representative embodiment of the present invention.
Figure 2D:
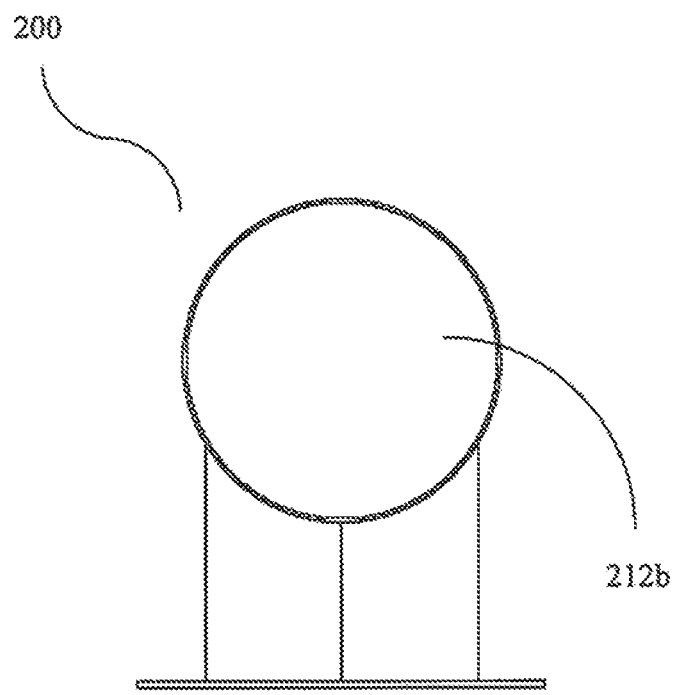
FIG. 2D is an end view of the screen intake assembly of FIG. 2A.

With reference to FIGS. 2C and 2E, each screen portion 206a, 206b can include an underlying support structure 220. The underlying support structure 220 of screen intake assembly 200 can comprise a plurality of spaced apart horizontal support bars 222 that are each arranged transversely to axis A. Each screen portion 206a, 206b and the corresponding underlying support structure 220 including support bars 222 can be fabricated based on the same principles as the embodiments disclosed in U.S. Pat. Nos. 6,663,774, 7,425,264 and 9,399,858, all of which are herein incorporated by reference in their entirety.

Figure 3:
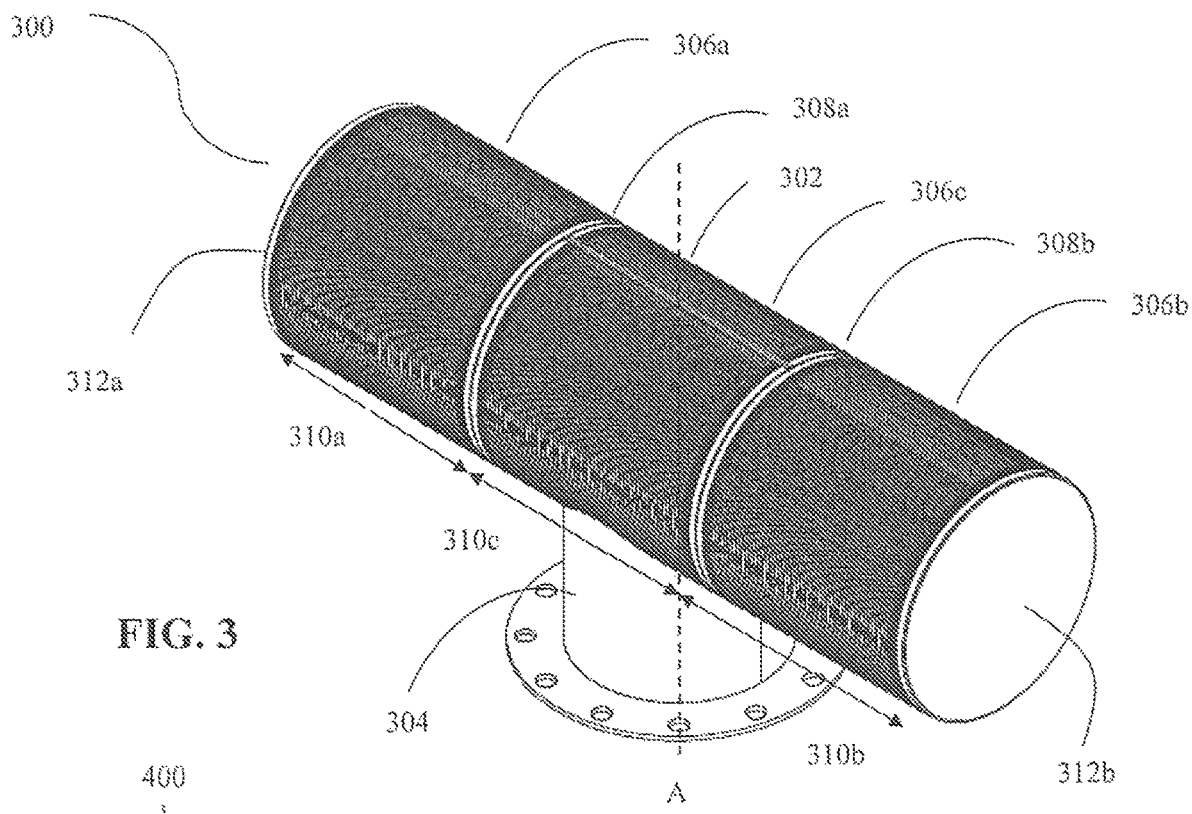
FIG. 3 is a perspective view of a screen intake assembly according to an embodiment of the present invention.

As seen in FIG. 3, a screen intake assembly 300 can comprise a variation of screen intake assembly 200 with a modification to the one or more manifold walls 208a, 208b. Instead of manifold walls 208a, 208b being positioned in proximity to axis A, manifold walls 308a, 308b can be spaced apart from axis A such that a central portion 302 defines its own screen portion 306c. As such, screen portions 306a, 306b each have a screen length 310a, 310b defined between the corresponding manifold wall 308a, 308b and a corresponding end plate member 312a, 312b. Screen portion 306c has a screen length 310c that is defined between the manifold walls 308a, 308b. Cooperatively, the screen portions 306a, 306b, 306c define a substantially continuous filtering surface between the end plate members 312a, 312b. As depicted, each screen portion 306a, 306b, 306c can comprise approximately one-third the entire length of the screen intake assembly 300. In other embodiments, the screen portions 306a, 306b can have the same screen length 310a, 310b that differs from screen length 310c of the screen portion 306c.

Figure 4A:
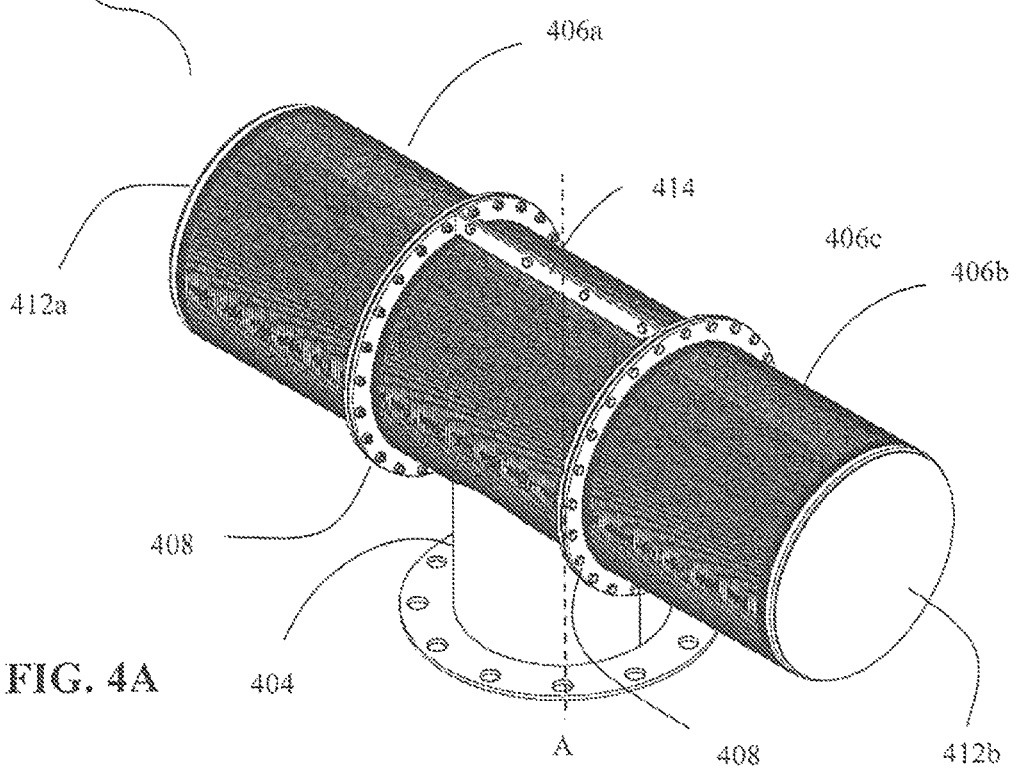
FIG. 4A is a perspective view of screen intake assembly according to an embodiment of the present invention.
Figure 4B:
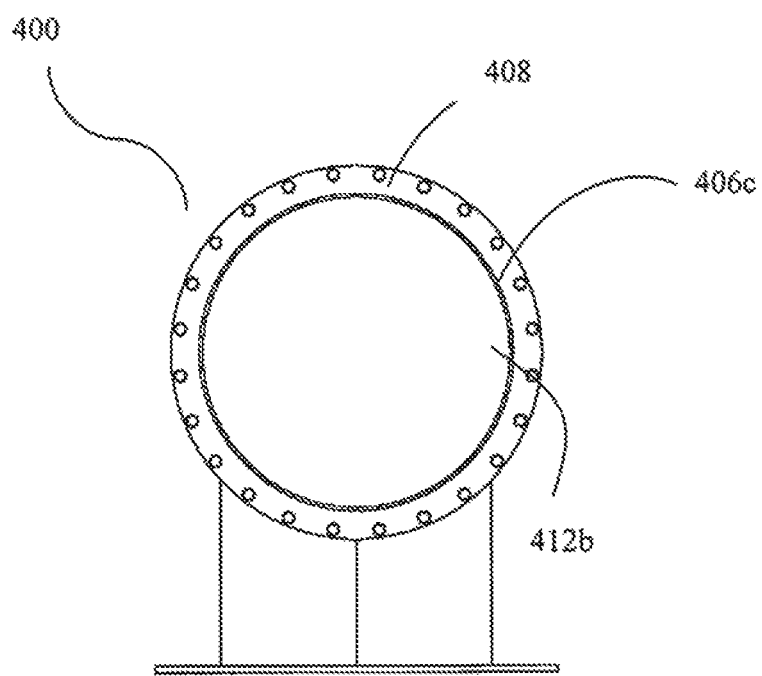
FIG. 4B is an end view of the screen intake assembly of FIG. 4A.
Figure 5A:
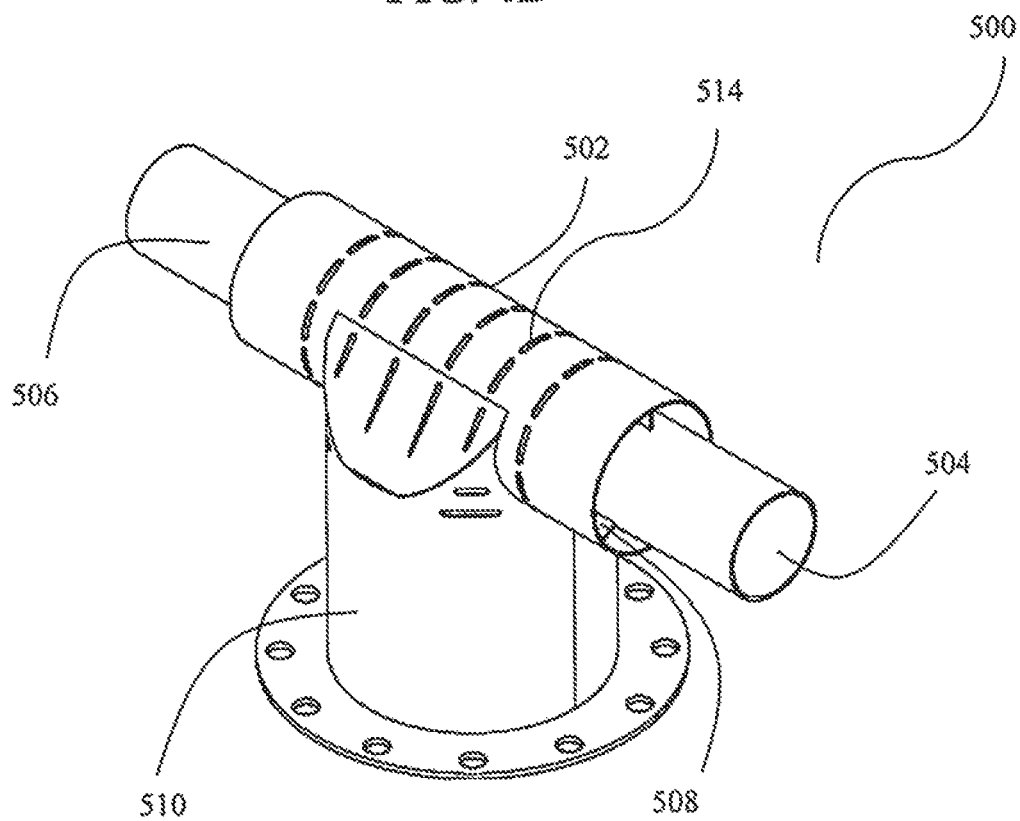
FIG. 5A is a perspective view of an internal flow modifier for use with a screen intake assembly according to an embodiment of the present invention.
Figure 5B:
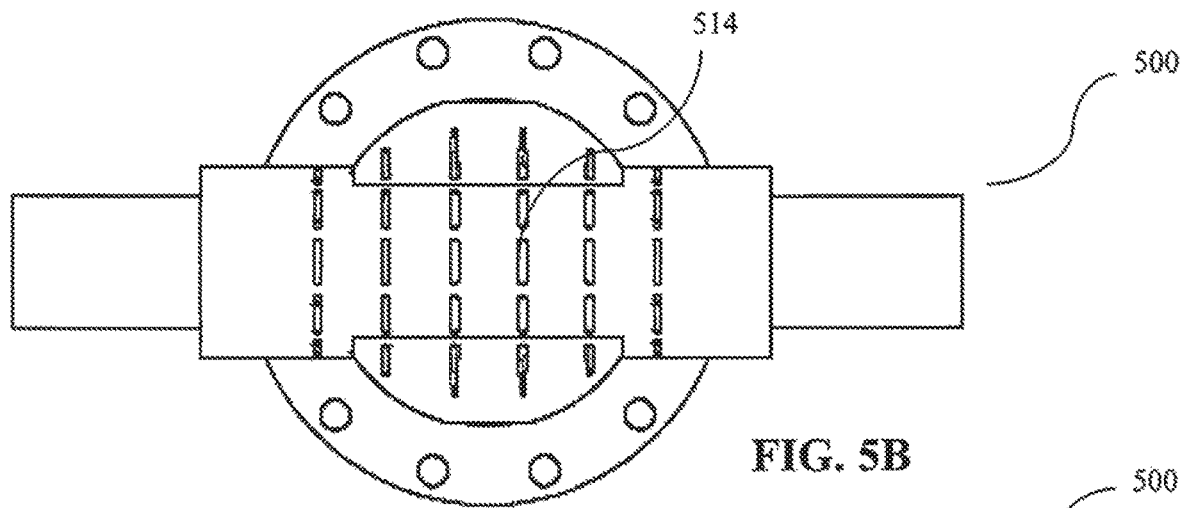
FIG. 5B is a top view of the internal flow modifier of FIG. 5A.
Figure 5C:
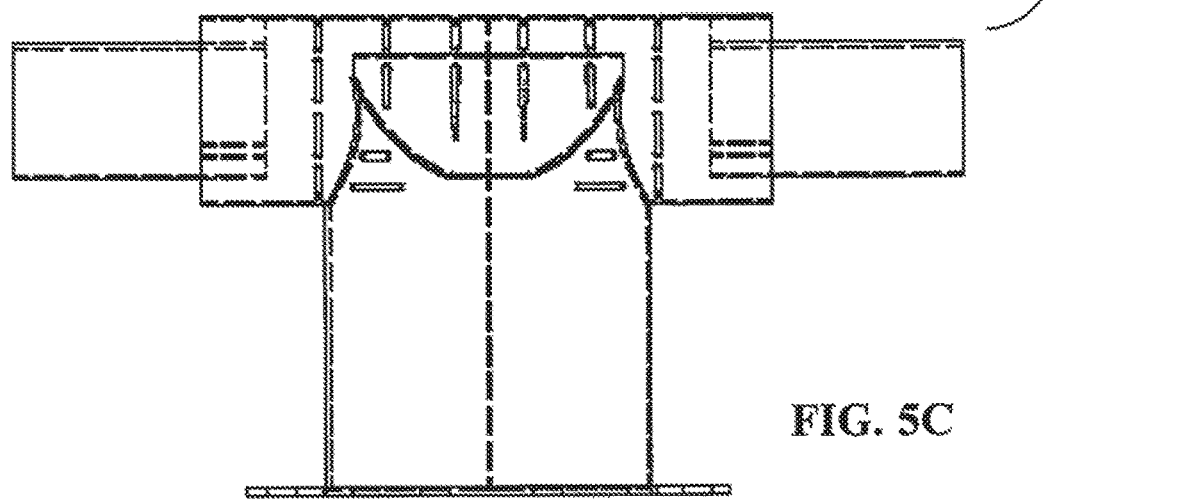
FIG. 5C is a front view of the internal flow modifier of FIG. 5A.
Figure 5D:
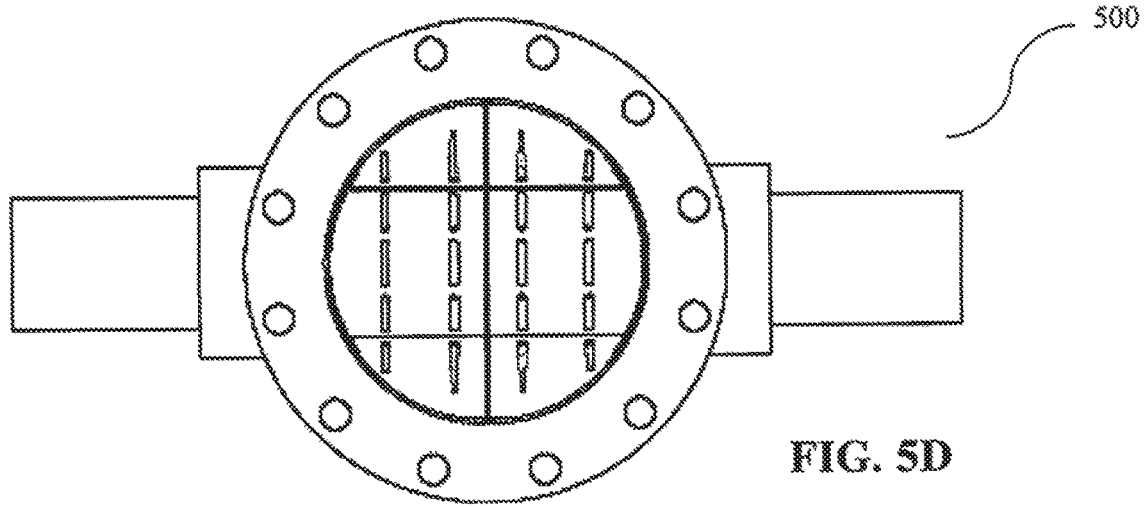
FIG. 5D is a bottom view of the internal flow modifier of FIG. 5A.
Figure 5E:
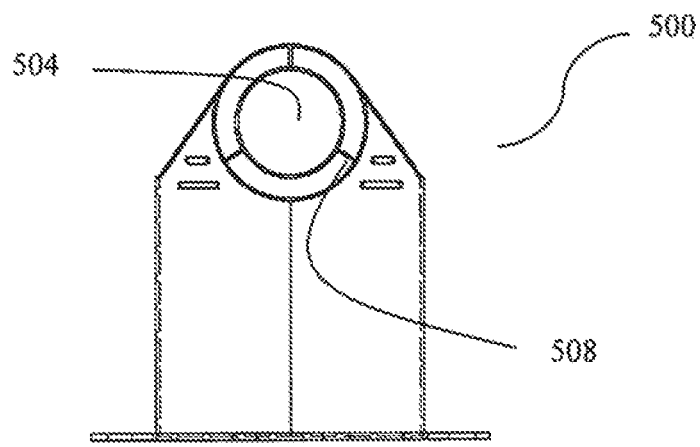
FIG. 5E is an end view of the internal flow modifier of FIG. 5A.
Figure 5F:
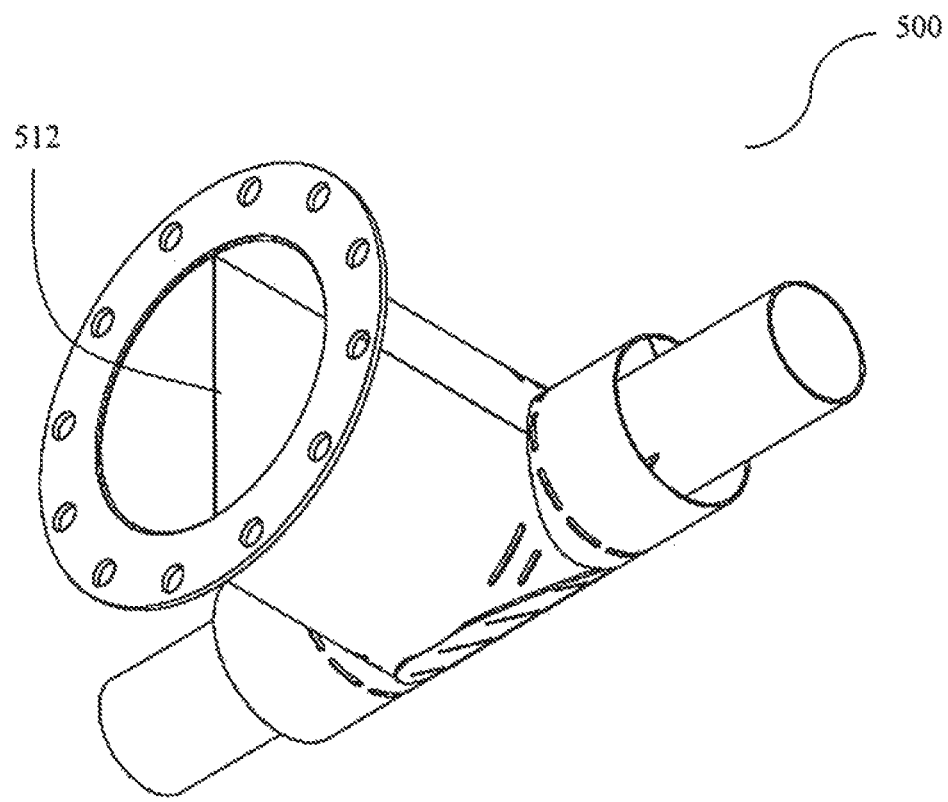
FIG. 5F is a bottom, perspective view of the internal flow modifier of FIG. 5A.
Figure 6A:
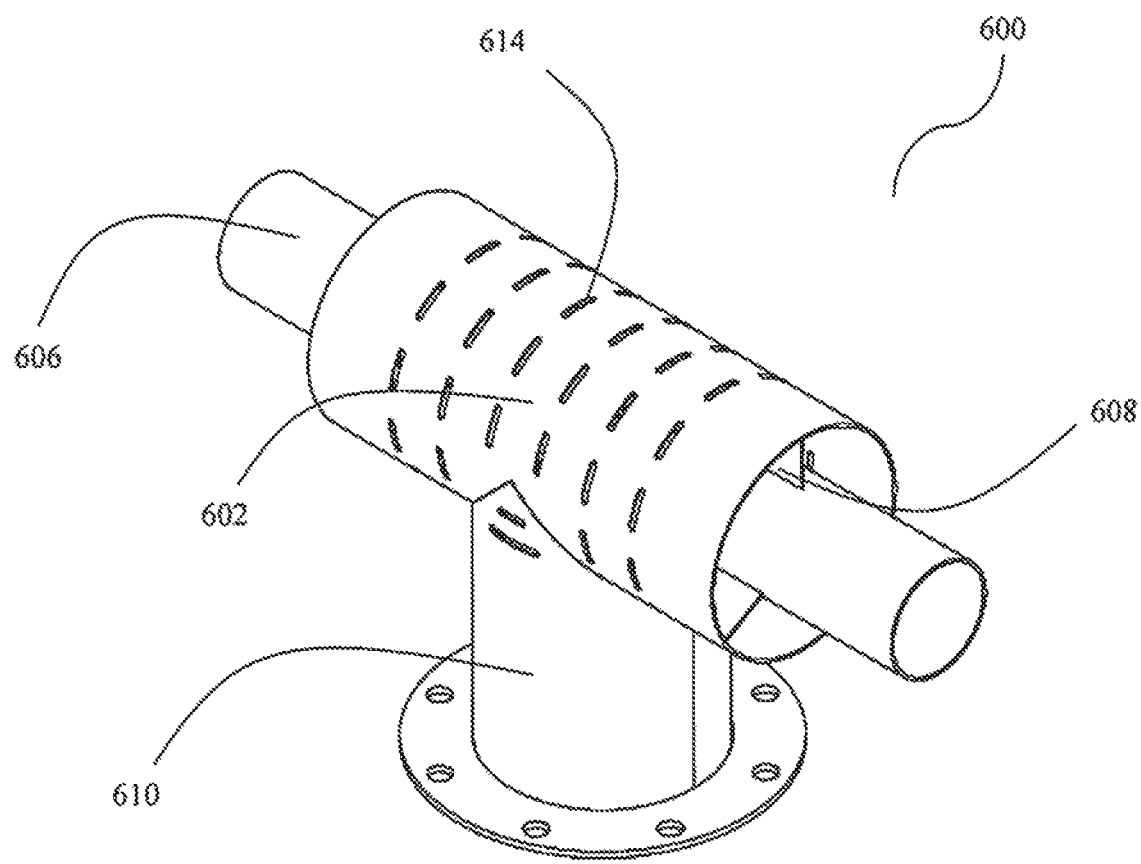
FIG. 6A is a perspective view of an internal flow modifier for use with a screen intake assembly according to an embodiment of the present invention.
Figure 6B:
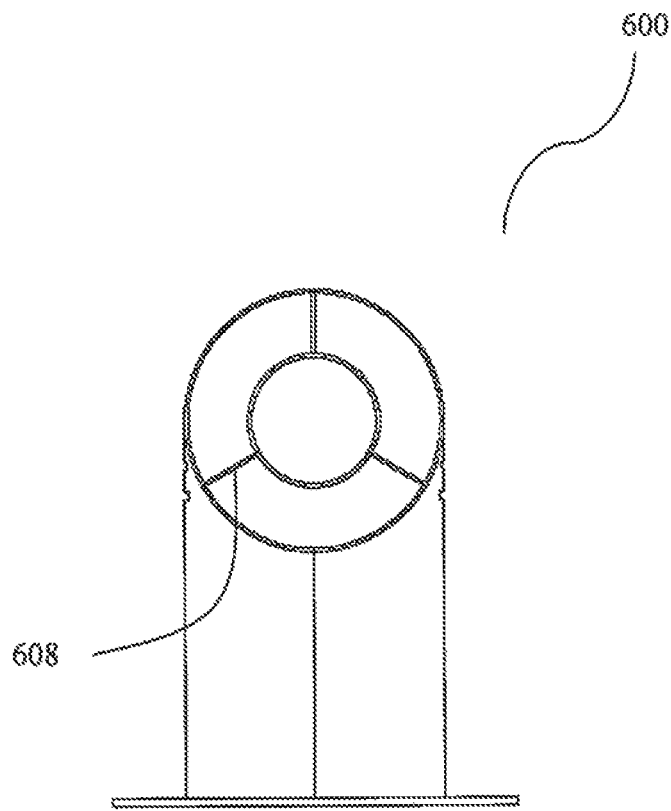
FIG. 6B is an end view of the internal flow modifier of FIG. 6A.
Figure 6C:
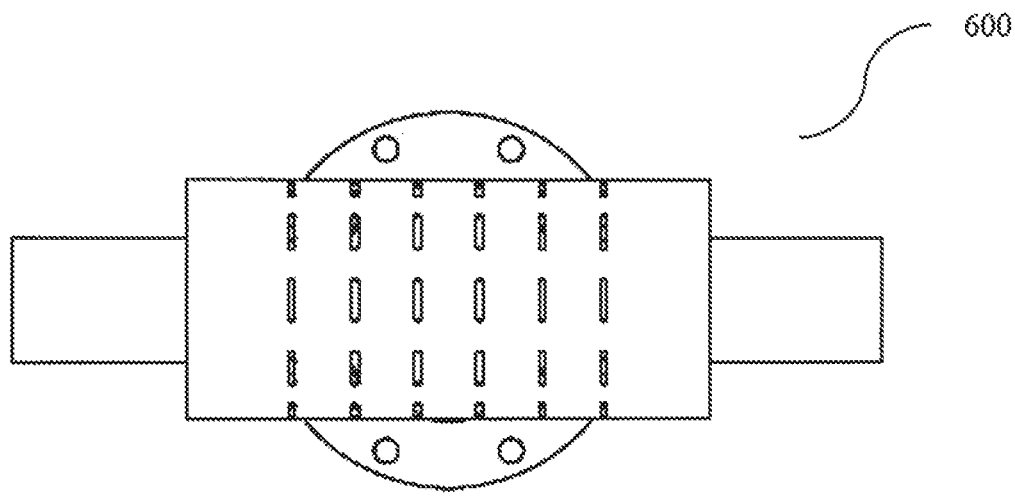
FIG. 6C is a top view of the internal flow modifier of FIG. 6A.
Figure 6D:
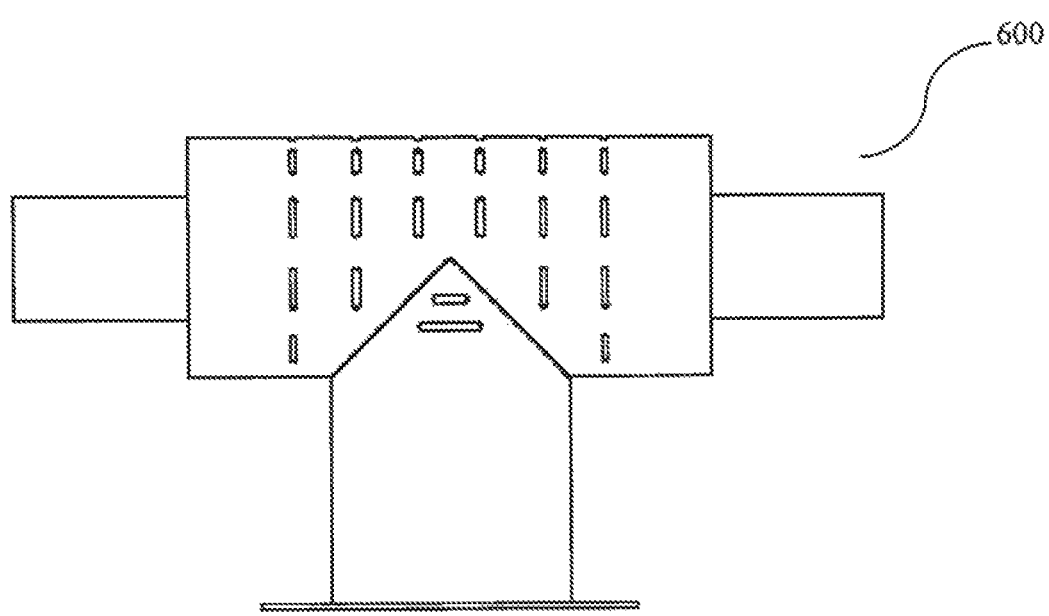
FIG. 6D is a front view of the internal flow modifier of FIG. 6A
Figure 7A:
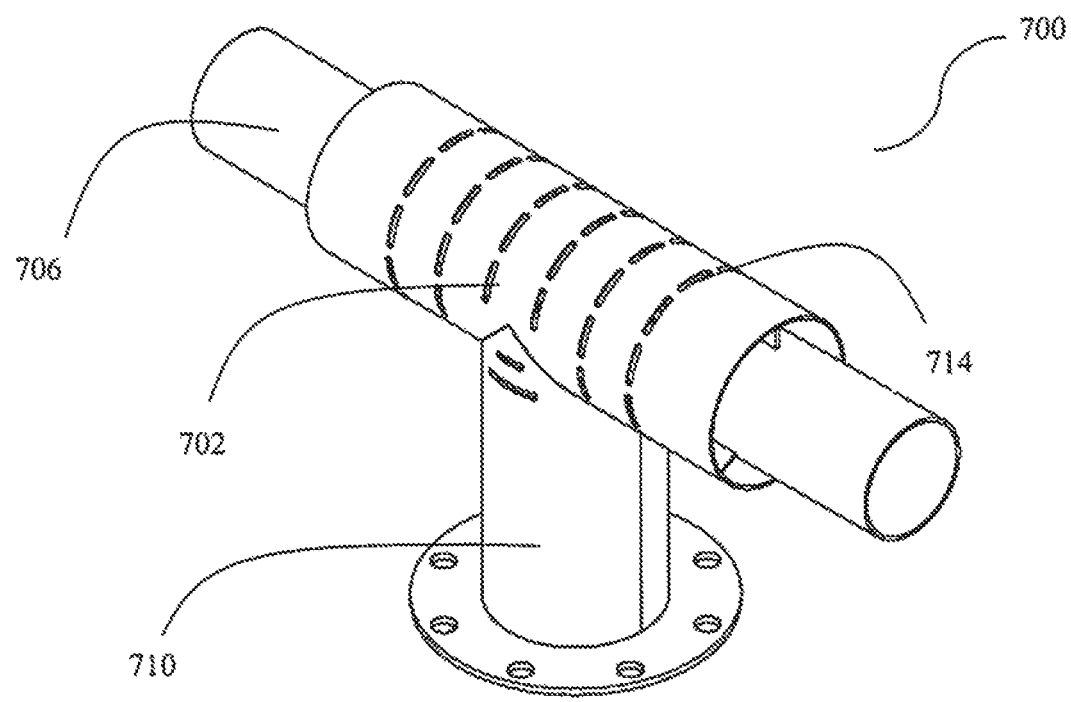
FIG. 7A is a perspective view of an internal flow modifier for use with a screen intake assembly according to an embodiment of the present invention.
Figure 7B:
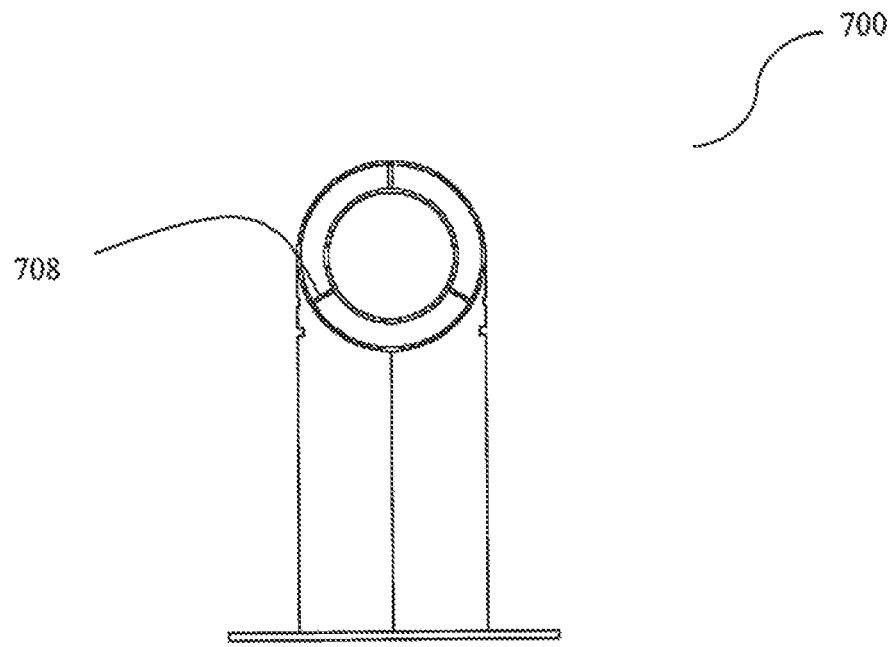
FIG. 7B is an end view of the internal flow modifier of FIG. 7A.
Figure 7C:
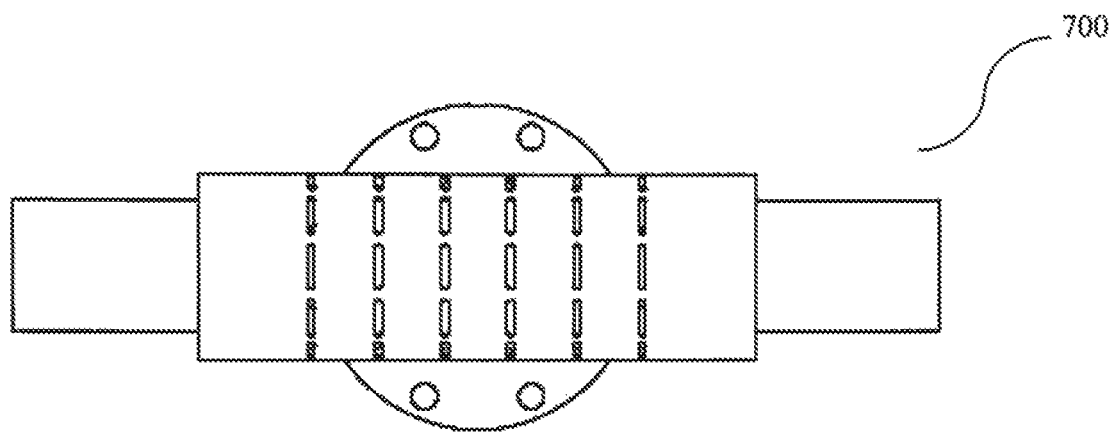
FIG. 7C is a top view of the internal flow modifier of FIG. 7A.
Figure 7D:
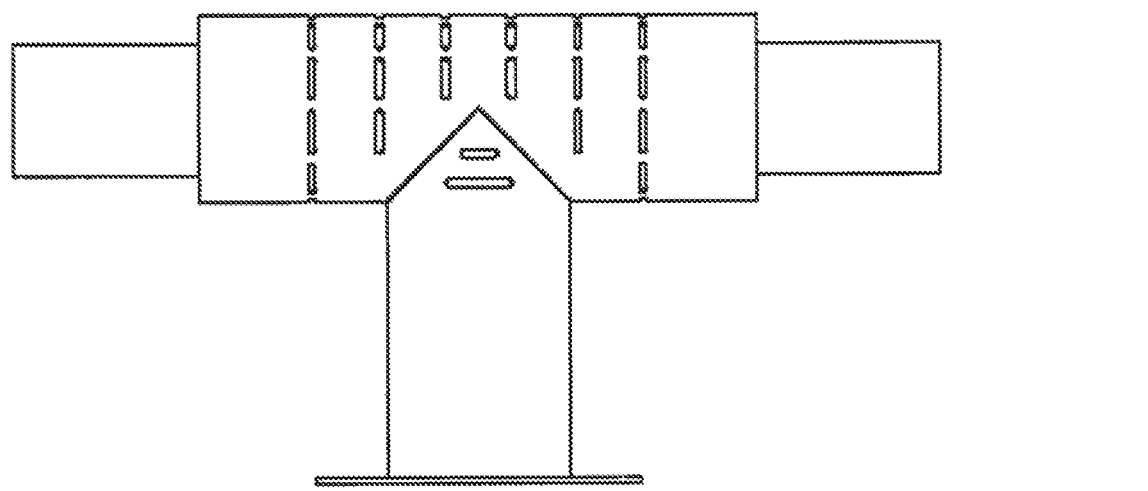
FIG. 7D is a front view of the internal flow modifier of FIG. 7A.
Figure 8A:
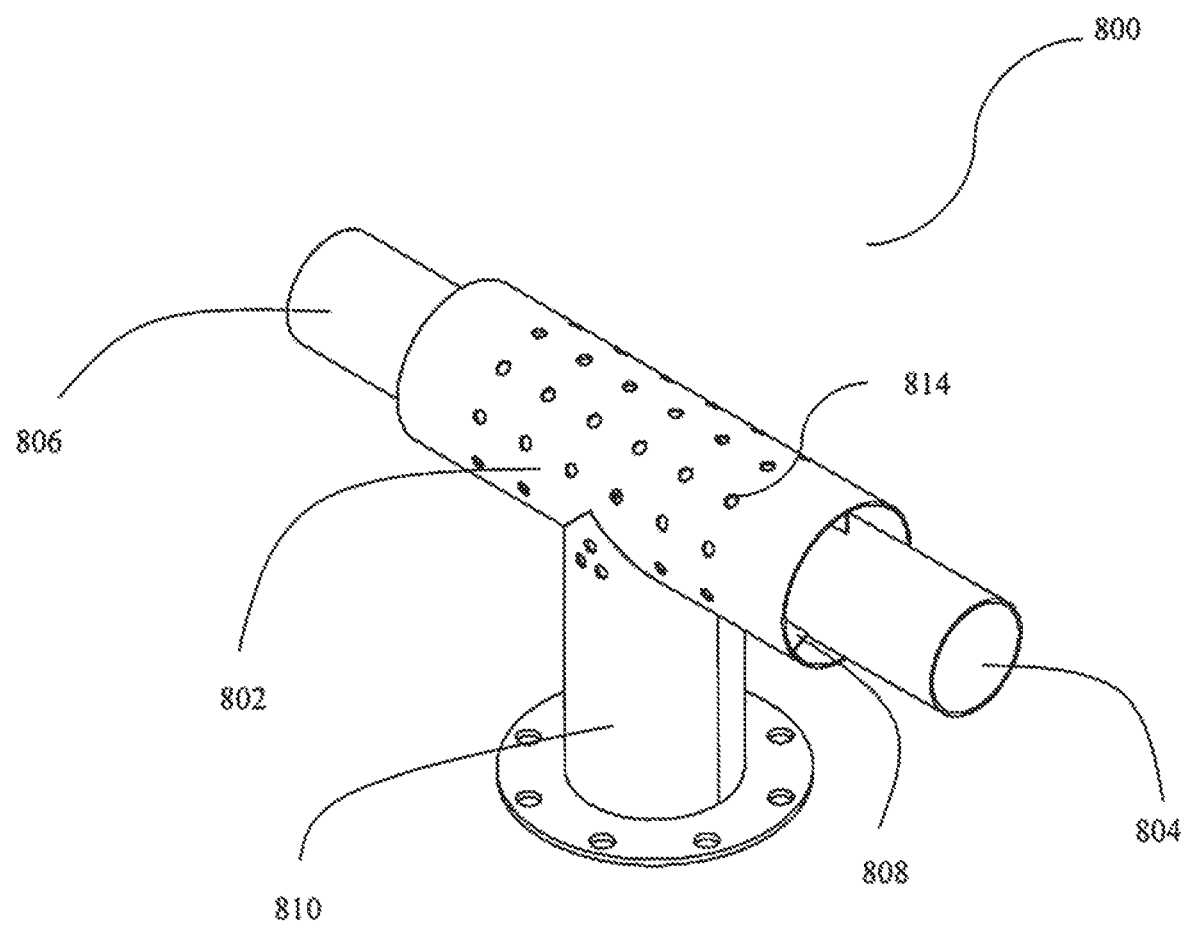
FIG. 8A is a perspective view of an internal flow modifier for use with a screen intake assembly according to an embodiment of the present invention.
Figure 8B:
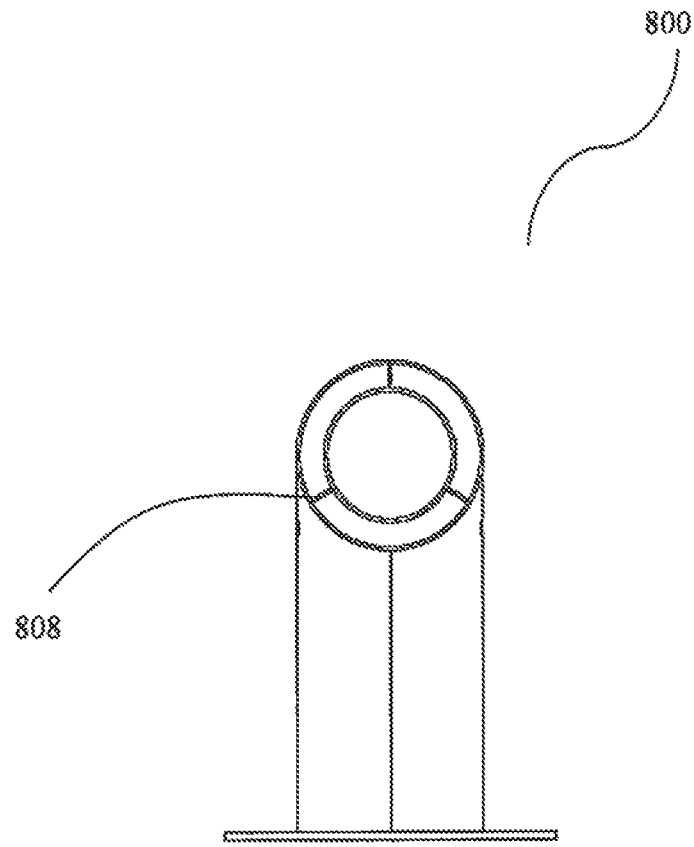
FIG. 8B is an end view of the internal flow modifier of FIG. 8A.
Figure 8C:
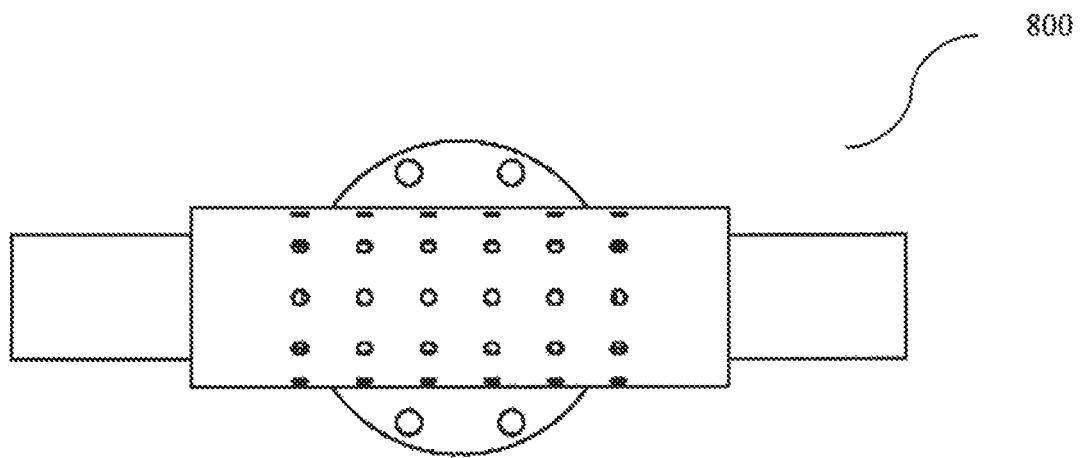
FIG. 8C is a top view of the internal flow modifier of FIG. 8A.
Figure 8D:
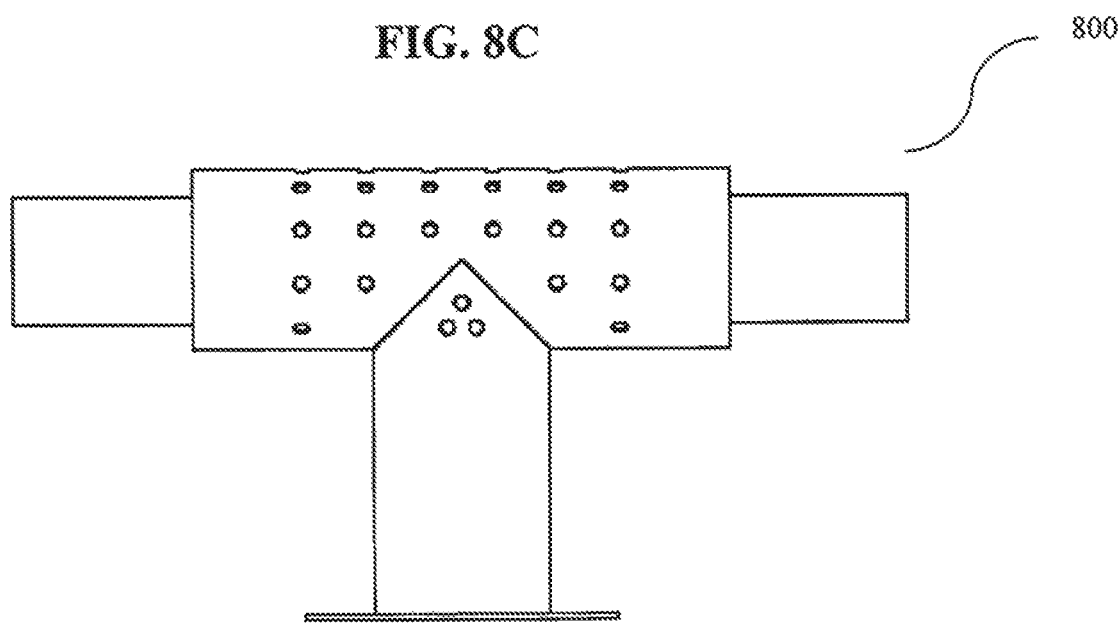
FIG. 8D is a front view of the internal flow modifier of FIG. 8A.
Figure 9A:
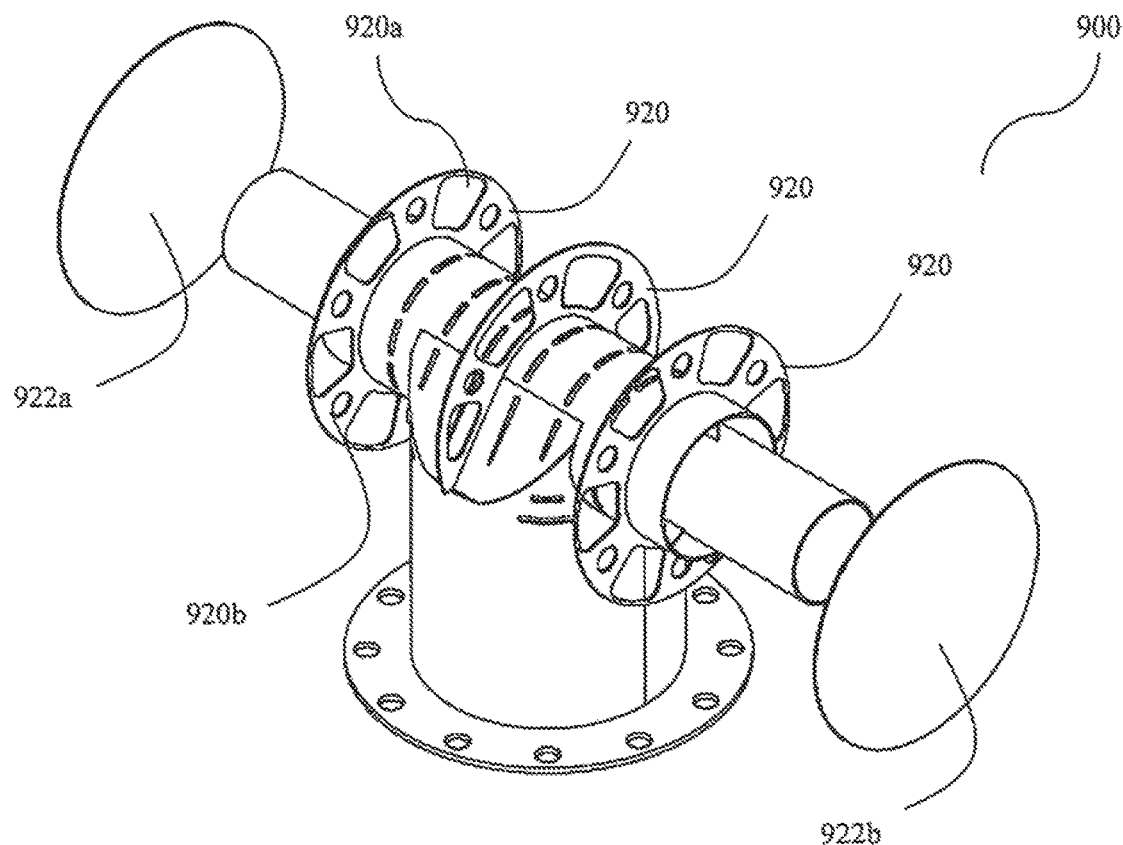
FIG. 9A is a perspective view of an internal flow modifier for use with a screen intake assembly according to an embodiment of the present invention.
Figure 9B:
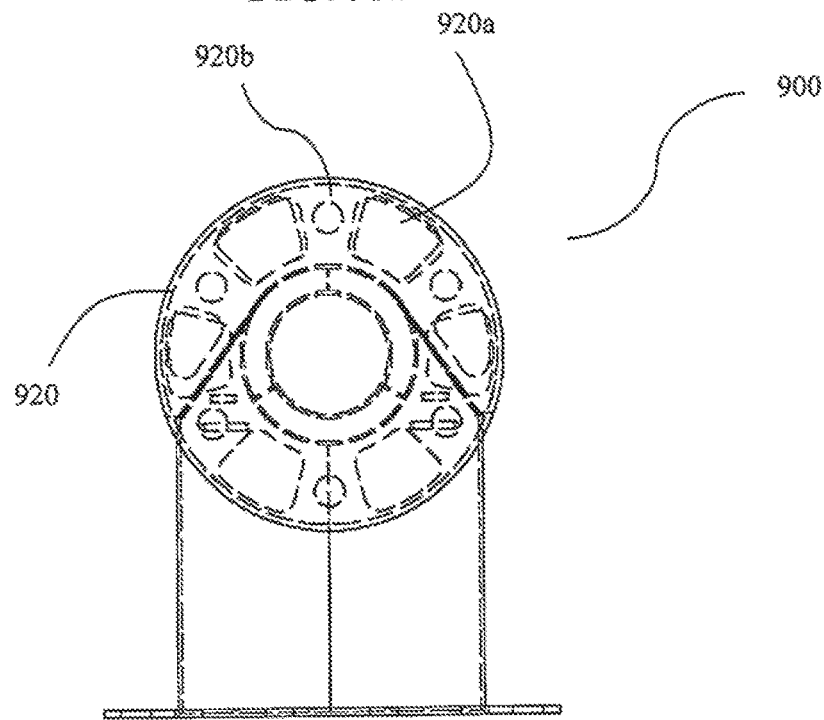
FIG. 9B is an end view of the internal flow modifier of FIG. 9A.
Figure 9C:
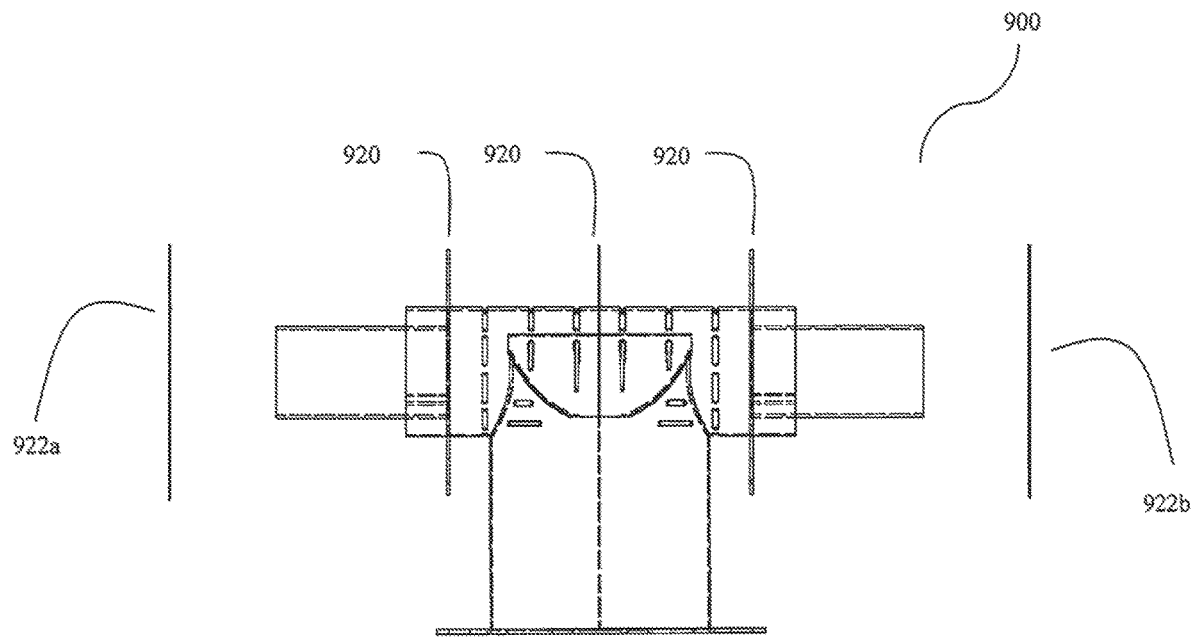
FIG. 9C is a front view of the internal flow modifier of FIG. 9A.
Figure 9D:
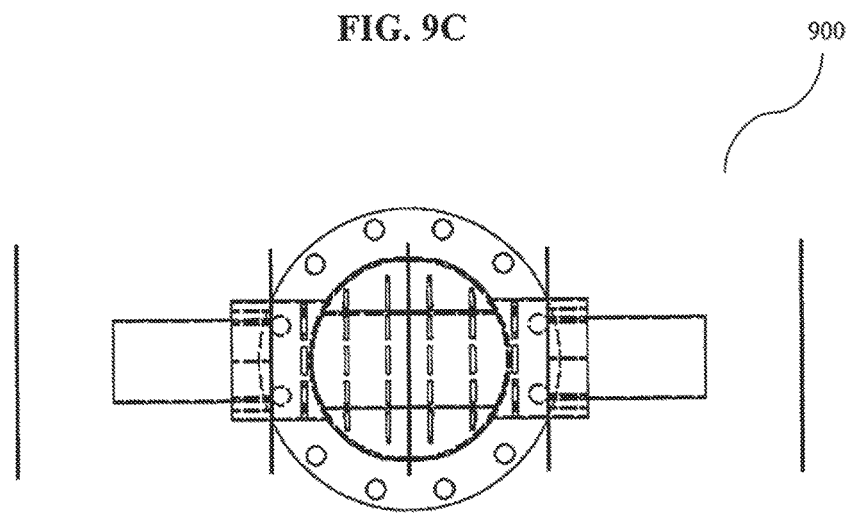
FIG. 9 is a bottom view of the internal flow modifier of FIG. 9A.

A further variation to screen intake assemblies 200 and 300 is illustrated in FIGS. 4A and 4B as screen intake assembly 400. Each of screen portions 406a, 406b can be fabricated to include an external flange wall 408 while screen portion 406c can include a pair of opposed external flange walls 408. Screen portion 406c can further include one or more external support rib 414 arranged transversely to axis A and extending between the opposed external flange walls 408. Though not depicted, it will be understood that screen portions 406a, 406b can also include a pair of opposed external flange walls 408 such that end caps 412a, 412b are coupled to the respective external flange wall 408. In addition, screen portions 406a, 406b can also include one or more external support ribs 414. Through the use of the external flange walls 408, on-site assembly or expansion of the screen intake assembly 400 can be quickly and easily accomplished. External flange walls 408 can also provide impact protection for the screen portions 406a, 406b, 406c by helping to prevent large objects such as sticks and logs from coming into direct contact with the screen portions 406a, 406b, 406c. It is understood that the use of external flange walls 408 can be secured by bolts or any other material or method that provides a secure closure of flanges and screen portions 406a, 406b, 406c without substantially impacting the integrity of the screen assembly 400.

Referring now to screen intake assemblies 200, 300 and 400, each screen intake assembly can comprise a lower portion 204, 304, 404 as seen in FIGS. 2A, 3, and 4A. As illustrated, these lower portions 204, 304, 404 can comprise a solid material such as stainless steel or copper-nickel tubing/piping so as to prevent fluid from penetrating the lower portion and entering the screen intake assemblies 200, 300, 400 without being filtered by the corresponding screen portions. In alternative embodiments, lower portions 204, 304, 404 can be incorporate their own screen portions similar to that previously described. In yet other embodiments, the lower portions 204, 304, 404 can be fabricated from a material having perforations such as slots or apertures that allow fluid intake. In all embodiments, materials selected for lower portions 204, 304, 404 should provide the necessary support for the screen intake assemblies 200, 300, 400 such that the structural support is not compromised.

In addition to the external features described with respect to screen intake assemblies 200, 300 and 400 above, representative embodiments of the present invention can incorporated a variety of internal structures to adjust flow performance and to increase structural strength. As illustrated in FIGS. 5A-5F, an internal flow modifier 500 can be contained within a screen intake assembly, for example, any of screen intake assemblies 100, 200, 300 and 400. Generally, internal flow modifier 500 can comprise a perforated flow modifier pipe 502, an internal flow modifier pipe 504, one or more radial support members 508 and a lower portion 510 that is fluidly coupled to the internal flow modifier pipe 504. Perforated flow modifier piper 502 can comprise a solid pipe or tube-style materials having a plurality of spaced apart slots 514 to allow fluid to enter the internal flow modifier pipe 504. The size, shape and spacing of slots 514 to allow for even flow intake along the length of the perforated flow modifier pipe 502, thereby reducing pressure drops and assist in avoiding turbulent flow. Lower portion 510 can have a cross section substantially equal to or larger than perforated flow modifier pipe 502. Lower portion 510 can further comprise a divider plate 512 providing structural support as well as further dividing incoming flow coming from the various screen portions.

FIGS. 6A-6D and FIGS. 7A-7D illustrate other alternative embodiments of internal flow modifiers 600 and 700 respectively. Each of the internal flow modifiers 600, 700 comprise a perforated flow modifier pipe 602, 702, an internal flow modifier pipe 606, 706, one or more radial supports 608, 708, lower portion 610, 710, and an intake portion (not shown). According to embodiments, perforated flow modifier pipe 602, 702 comprises a solid material with spaced apart slots 614, 714 to allow fluid intake. In representative embodiments, lower portions 610, 710 can have a cross section substantially equal to the perforated flow modifier pipe 602, 702. In embodiments, the cross section of the perforated flow modifier pipe 602, 702 and lower portion 610, 710 can be sized to accommodate a variety of fluid intake assemblies.

FIGS. 8A-8D illustrate another alternative embodiment of an internal flow modifier 800. Internal flow modifier 800 can comprise a perforated flow modifier piper 802, inlet an internal flow modifier piper 806, one or more radial supports 808, lower portion 810, and an intake portion (not shown). According to embodiments, perforated flow modifier pipe 802 can comprise a solid material with spaced apart apertures 814 to allow even flow intake along the length of the perforated flow modifier pipe 802, thereby reducing pressure drops and assisting to avoid turbulent flow. In embodiments, the cross section of perforated flow modifier pipe 802 and lower portion 810 can be sized to accommodate a variety of fluid intake assemblies.

As illustrated in FIGS. 9A-9D, an embodiment of an internal flow modifier 900 can comprise circumferential support members 920 and circumferential end portions 922a, 922b. According to embodiments, circumferential supports 920 are coupled to a perforated internal flow modifier 902 and end portions 922 can be coupled to screen portions (not shown). Both circumferential supports 920 and end portions 922 provide support to the exterior screen portions. Each of the circumferential supports 920 can include a variety of flow apertures 920a, 920b to assist in moderating fluid flow within a screen intake assembly. In certain embodiments, the flow apertures 920a between adjacent circumferential supports 920 can be positioned along the same radial axis while in other embodiments, flow aperture 920a can be positioned along the same radial axis as flow aperture 920b or on the adjacent circumferential support 920. Yet in other representative embodiments, adjacent circumferential supports 920 can be arranged so that none of the flow apertures 920a, 920b are aligned in the same radial axis.

Figure 10A:
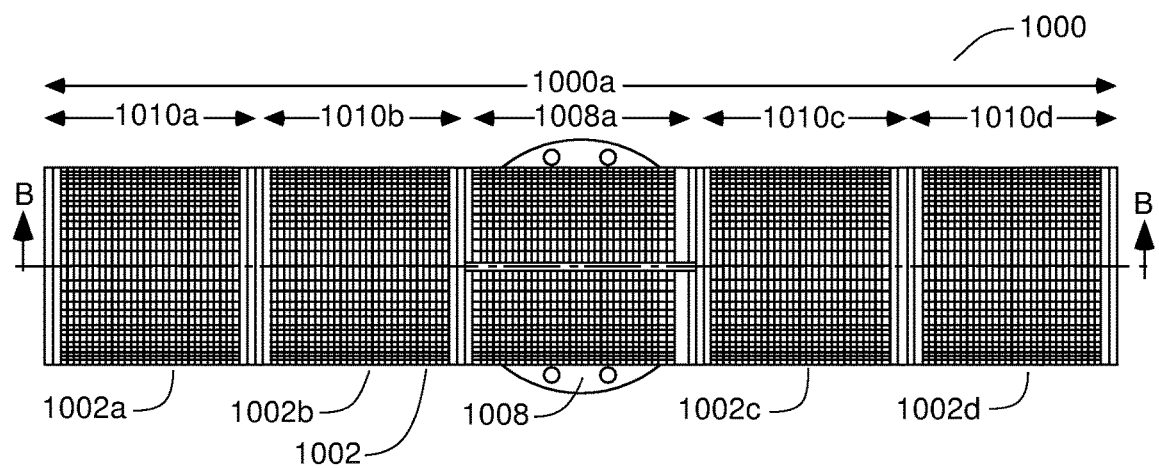
FIG. 10A is a perspective view of an expandable screen intake assembly according to an embodiment of the present invention.
Figure 10B:
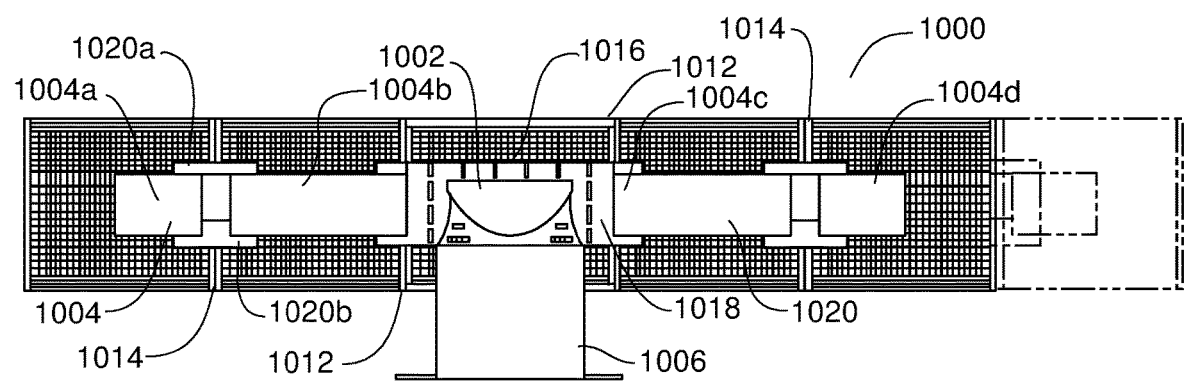
FIG. 10B is a partially hidden, section side view of the expandable screen assembly of FIG. 10A taken at line B-B of FIG. 10A.

According to an alternative embodiment as depicted in FIG. 10, a fluid intake assembly 1000 can be designed for expansion such that screen portions 1002 and an internal flow modifier 1004 can be selectively added to accommodate desired liquid intake rates. Generally, fluid intake assembly can comprise a center manifold 1006 about which a manifold screen portion 1008 can be attached. On either side of the manifold screen portion 1008, a plurality of individual screen portions 1002a, 1002b, 1002c, 1002d can be operably coupled together. Manifold screen portion 1008 can having a manifold screen portion length 1008a while the individual screen portions 1002a, 1002b, 1002c, 1002d each have a corresponding screen portion length 1010a, 1010b, 1010c, 1010d such that an intake assembly screen length 1000a is cooperatively defined by the manifold screen portion length 1008a and the screen portion lengths 1010a, 1010b, 1010c, 1010d. As illustrated, the manifold screen portion 1008 and individual screen portions 1002a, 1002b, 1002c, 1002d can be operably connected using manifold walls 1012 or section walls 1014. As illustrated, the manifold walls 1012 and section walls 1014 can be located internally of the fluid intake assembly 100 though it will be understood that the manifold walls 1012 and section walls 1014 could be located externally, for example, as external flange walls similar to external flange wall 408 of the embodiment shown in FIGS. 4A and 4B so as to simply onsite assembly and expansion. The internal flow modifier 1004 can similarly comprise a plurality of flow modifier sections 1004a, 1004b, 1004c, 1004b that are operably coupled to a central flow modifier 1016 located within the center manifold 1006. The length and arrangements of the individual flow modifier sections 1004a, 1004b, 1004c, 1004d can be individually tailored based on desired performance as well as the intake screen assembly length 1000a. In one representative embodiment, the internal flow modifier sections 1004a, 1004b, 1004c, 1004d and central flow modifier 1016 can define a perforated flow modifier pipe 1018 and an internal flow modifier pipe 1020. The internal flow modifier 1004 can further comprise one or more converging flow modifiers 1020a and 1020b coupled manifold walls 1020, and inlet pipe portion 1004. With the expandable nature of fluid intake assembly 1000, an almost infinite arrangement of screen portions 1002 and internal flow modifier 1004 can be fabricated or assembled on-site. In some instances, existing fluid intake assemblies 1000 can be contracted or expanded on-site as fluid needs change at a point of use.

As illustrated and described with reference to the previous embodiments, various fluid intake assembly designs are contemplated in which the one or more screen members are fabricated so as to define a substantially round or circular cross-sectional area between the closure members/end plates. Alternatively, there may be installations, for example, locations having shallow depths such as rivers, where it would be advantageous to have a non-circular cross-section to reduce an overall height, or even width, of the screen intake assembly. For example, a screen intake assembly 1100 as shown in FIGS. 11A-11D can comprise a reduced height design 1102 having a non-circular cross-section 1104, herein illustrated as a substantially oval-like cross-section 1106 for a pair of screen portions 1107a, 1107b and a central tee-portion 1107c. Non-circular cross-section 1104 is herein defined by each of the screen portions 1107a, 1107b and central tee-portion 1107c having a screen portion height 1109a that is less than a screen portion width 1109b. Though not illustrated, it will be understood that there may be installation advantages wherein the non-circular cross-section is essentially reversed from that shown in FIGS. 11A-11D such that the screen portion height 1109a is greater than the screen portion width 1109b. Still in other embodiments, it may be advantageous to have other geometrical configurations for the non-circular cross-section 1104 including, example, squares, rectangles, triangles pentagons, hexagons, octagons and the like. As illustrated, screen portions 1107a, 1107b can each include corresponding exterior screen members 1108a, 1108b and can include a corresponding closure member or end plate 1110a, 1110b that define oval-like perimeters 1112a, 1112b that substantially resemble the oval-like cross-section 1106. The central tee-portion 1107c can include a central exterior screen member 1114 as well as a manifold 1116 for delivering a filtered fluid to a point of use. The exterior screen members 1108a, 1108b and central exterior screen member 1114 can comprise wedge wire or Vee-Wire® style screens which are selected to provide desired filtering characteristics as well as desired flow characteristics including, for example, flow capacity and flow velocity. The manifold 1116 can further comprise an outlet conduit 1117 that can be fluidly connected to an internal flow modifier 1118. In order to accommodate the oval-like cross-section 1106, the internal flow modifier 1118 can comprise a central collector 1120 and a plurality of lateral collectors 1122 configured to provide desirable flow characteristics within the screen intake assembly 1100 and taking into consideration the non-circular nature of the oval-like cross-section 1106. One or more of the central collectors 1120 and the lateral collectors 1122 can comprise perforations or slots 1124 to vary flow characteristics into the manifold 1114. Likewise, wedge wire style screens can be positioned along the screen members 1108a, 1108b, end plates 1110a, 1110b and/or the central tee-section 1116 to get a desired flow capacity and other flow characteristics.

In addition to the variety of configurations for screen intake assemblies described previously, it can be advantageous to vary the construction technique of the individual screen portions themselves. For example, a conventional screen filter 1200 of the prior art is shown in FIG. 12A Generally, a continuous spool of v-shaped wire 1202 is continually wrapped about and welded to one or more support members 1204. Generally, a wire gap 1205 is defined between adjacent corners 1208 of the adjacently wrapped and welded v-shaped wire 1202. A gap length 1206 of the wire gap 1205 generally equates to the size of particulates filtered or "removed" from fluid that passes through the filer screen 1200, i.e., the filter rating.

Not only can the disclosed screen intake assemblies of the current invention utilize the conventional screen filter 1200 but they can also use an improved screen filter 1250 as shown in FIG. 12B. Screen filter 1250 similarly utilizes one or more support members 1204 but uses two different sized v-shaped wires, a first v-shaped wire 1251 and a second v-shaped wire 1252. First v-shaped wire 1251 can be defined by a first wire height 1251a and a first wire width 1251b while the second v-shaped wire 1252 is defined by a second wire height 1252a and a second wire width 1252b. As illustrated, the first wire height 1251a and first wire width 1251b can be larger than the second wire height 1252a and second wire width 1252b such that a first cross-sectional area 1251c (of the first v-shaped wired 1251) is greater than that of a second cross-sectional area 1252c (of the second v-shaped wire 1252). As illustrated, first cross-sectional area 1251c is larger than that of the second cross-sectional area 1252c such that a first wire gap 1254 is defined between adjacent wraps of the first v-shaped wire 1251 while a second wire gap 1256 is defined between the second v-shaped wire 1252 and the first v-shaped wire 1251 on either side of the second v-shaped wire 1252. As illustrated, first wire gap 1254 can have a first gap length 1258 that is substantially larger than a second gap length 1260 of the second wire gap 1256. The second wire gap 1256 can generally equate to the filter rating of the improved screen filter 1250 while the first wire gap 1254 defines an initial rough filter that can reduce an effective top surface velocity in an attempt to reduce impingement of wildlife and/or debris at the second wire gap 1256. For example, first wire gap 1254 can be sized such that a fluid velocity through the first wire gap 1254 is equal or less than about 0.5 ft/sec such that aquatic life such as, for example, fish can avoid being trapped against an exterior of the improved screen filter 1250. In addition, when the second v-shaped wire 1252 is smaller than that of the v-shaped wire 1202 of conventional screen filter 1200, the number of second wire gaps 1256 defined in the available surface area of the improved screen filter 1250 will be larger than the number of wire gaps 1206 in the same surface area of the conventional screen filter 1200. By providing more of the second wire gaps 1256, screen filter 1250 provides more available filtering area than the conventional screen filter 1200 so as to increase the overall capacity of any screen intake assembly utilizing the improved screen filter 1250 while still maintaining a reduced fluid velocity at the exterior surface of the improved screen filter 1250. Depending upon desired flow characteristics, one or more of the first wire height 1251a, first wire width 1251b, second wire height 1252a and second wire height 1252b can be adjusted to selectively change one or both of the first wire gap 1254 and second wire gap 1256 to achieve desired fluid velocities through one or both of the first wire gap 1254 and second wire gap 1256.

In yet another alternative embodiment, the various screen intake assemblies of both the prior art and the novel configurations disclosed herein can further incorporate a removal system for limiting attachment and/or detaching biofouling materials and other debris from a screen filter. For example, a removal system 1300 can comprise an oscillator assembly 1302 to continually or selectively induce vibration to the screen assembly to deter and/or remove contaminants from the screen assembly as shown in FIG. 13A. Oscillator assembly 1302 can comprise a device capable of generating ultrasonic or low frequency vibrations. Generally, a screen intake assembly 1304 can comprise a central portion 1306 operably coupled to one or more screen portions 1308. The oscillator assembly 1302 can be operably attached to the central portion 1306 such that vibrations created by the oscillator assembly 1302 are transmitted through the central portion 1306 and to a screen filter 1309 on the exterior of each screen portion 1308. As shown in FIG. 13A, the oscillator assembly 1302 can be operably connected to a remote power source 1310 for example, an electrical grid or an onshore/barge/rig mounted generator. Alternatively, the oscillator assembly 1302 can be powered using a turbine or propeller style assembly 1312 to convert a filtered fluid flow through the central portion 1306 to rotational energy that can directly power the oscillator assembly 1302 or to generate energy for storage in a battery source that is integral to or located in proximity to the oscillator assembly 1302 as shown in FIG. 13B.

Figure 13C:
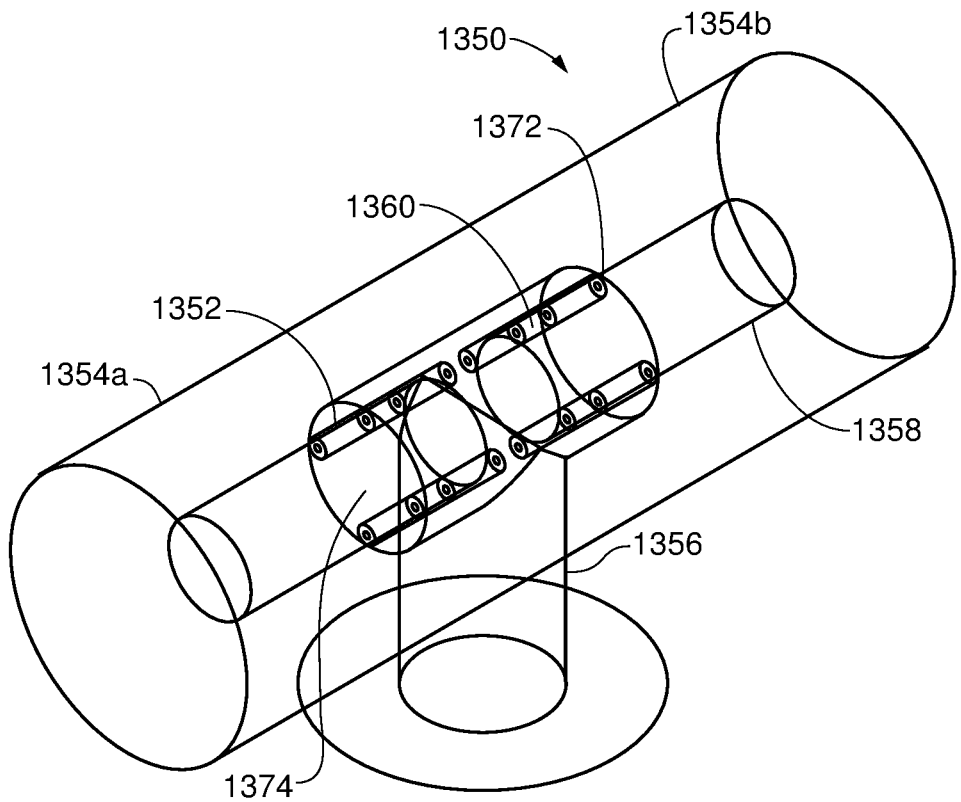
FIG. 13C is a partially hidden, perspective view of a screen intake assembly according to an embodiment of the present invention.
Figure 13D:
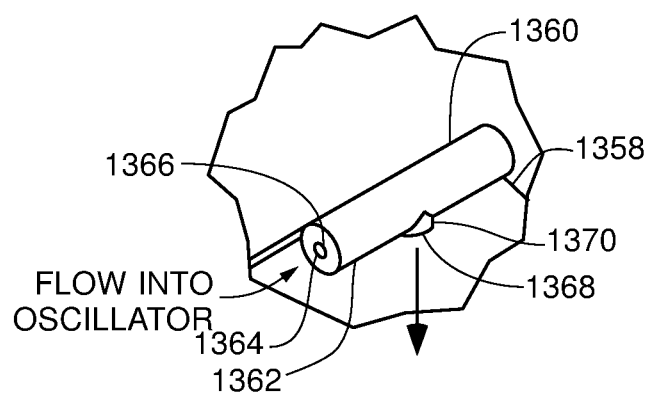
FIG. 13D is a detailed, perspective view of a flow-through oscillator assembly as utilized in the screen intake assembly of FIG. 13C.

In a variation to the removal system 1300, a screen intake assembly 1350 can comprise a flow-through oscillation system 1352 to continually induce vibration absent any moving or powered assemblies as shown in FIGS. 13C and 13D. As illustrated, the screen intake assembly 1350 can comprise a pair of screen portions 1354a, 1354b that are operably connected to a central-tee portion 1356. The screen intake assembly 1350 can further comprise an internal flow modifier system 1358 to provide desirable flow characteristics through the screen portions 1354a, 1354b. The internal flow modifier system 1358 can further comprise one or more flow-through oscillators 1360 that are positioned between the internal flow modifier system 1358 and the screen portions 1354a, 1354b. As best seen in FIG. 13D, each flow-through modifier 1360 can comprise a substantially tubular body 1362 defining an inlet 1364, a fluid channel 1366 and an outlet 1368. Outlet 1368 can define a connecting member 1370 that attaches to an aperture 1372 in the internal flow modifier system 1358 such that the fluid channel 1366 is fluidly connected to an interior flow-though portion 1374 of the internal flow modifier system 1358. As fluid flows into the internal flow modifier system 1358 and through the interior flow-though portion 1374, suction is created at the outlet 1368 such that fluid is drawn into the inlet 1364 and through the fluid channel 1366. Inlet 1368 and/or the fluid channel 1366 can be configured such that the fluid flow through the flow-through oscillator 1360 generates a resistance pattern or "whistle" that causes vibration which is ultimately transmitted to the screen portions 1364a, 1364b through the physically connection of the internal flow modifier system 1358 to the central tee-portion 1356. This resistance pattern or "whistle" is essentially continuous as long as fluid is flowing into the interior flow-through portion 1374. As such, no external or stored energy source is required for operation and there are no moving parts or mechanical assemblies requiring maintenance. As such, the flow-through oscillation system 1352 operates to limit attachment and/or accumulation of debris or biofouling materials in a continuous and economical manner.

The various screen intake assemblies of both the prior art as well as the novel configurations disclosed herein can further incorporate internal cleaning systems to remove accumulated debris and biofouling. As shown in FIG. 14A, it is well known in the prior art to utilize an internal air burst system 1400 within a screen intake assembly 1402 to delivery pulses of pressurize air 1403 to an interior portion 1404 of the screen intake assembly 1402. Generally, the internal air burst system 1400 comprises an airburst pipe 1406 positioned in proximity to a lower portion 1408 of a screen portion 1410. Typically, the airburst pipe 1406 is in fluid communication with a remotely located air compressor such as, for example, a compressor located onshore, on a barge or on a rig. The airburst pipe 1406 can be attached an airburst manifold located within a central portion of the screen intake assembly. Where the screen intake assembly comprises multiple screen portions 1410, an airburst pipe 1406 can be located within each screen portion 1410 and each airburst pipe 1406 can be operably connected to the airburst manifold. Generally, pulses of pressurized air can be supplied through the airburst pipe 1406 whereby the pulse of pressurize air starts displacing water proximate the lower portion 1408 and subsequently expands to fill and displace water throughout the screen portion 1410 to displace contaminants from the surface of the screen portion 1410.

In an improved airburst system 1420 of the present invention, a plurality of airburst pipes can be positioned at a variety of locations in addition to the lower portion 1408 as shown in FIGS. 14B-14D. For example, airburst pipe 1422a can be located proximate the lower portion 1408, airburst pipes 1422b, 1422c can be located proximate opposed sides 1424a, 1424b of the screen portion 1410 and airburst pipe 1422d can be located proximate an upper portion 1426 of the screen portion 1410. While the improved airburst system 1420 is illustrated as having four airburst pipes 1422a, 1422b, 1422c, 1422d, it will be understood that variables including, for example, the size of a screen intake assembly and the quality of the fluid being filtered can lead to designs utilizing either fewer airburst pipes with at least two being required or more than four airburst pipes. The airburst pipes 1422a, 1422b, 1422c, 1422d can all be operably connected to an airburst manifold located within a central portion 1428 of the screen intake assembly 1402. In the event that the screen intake assembly 1402 comprises both first and second screen portions 1430a, 1430b, each of the screen portions 1430a, 1430b can include the same arrangement of airburst pipes 1422a, 14222b, 1422c, 14222d. In some embodiments, pulses of pressurized air 1403 can be simultaneously delivered through each airburst pipe 1422a, 1422b, 1422c, 1422d as shown in FIG. 14B. Generally, the pulses of pressurized air are delivered through nozzles 1425a, slots, 1425 or similar apertures positioned along the length of each airburst pipe 1422a, 1422b, 1422c, 1422d. Alternatively, the pulses of pressurize air can be radially, sequentially delivered through the airburst pipes 1422a, 1422b, 1422c, 1422d as shown in FIG. 14C. In yet another alternative arrangement, the pulses of pressurized air can be sequentially delivered along an intake length 1432 defined between a first end 1434 and a second end 1436 of a screen intake assembly 1438 as seen in FIG. 14D. While the screen intake assembly 1438 of FIG. 14D contains first and second screen portions 1443a, 1443b connected to a central tee portion 1442, the same principle can be applied to provide pulses of pressurize air along an intake length that makes use of only a single screen portion. The particular arrangement and sequence of the pressurized air pulse delivery will generally be tailored to the installation and can depend upon the installation conditions and the type and quantity of particulate and biofouling accumulation.

Figure 15A:
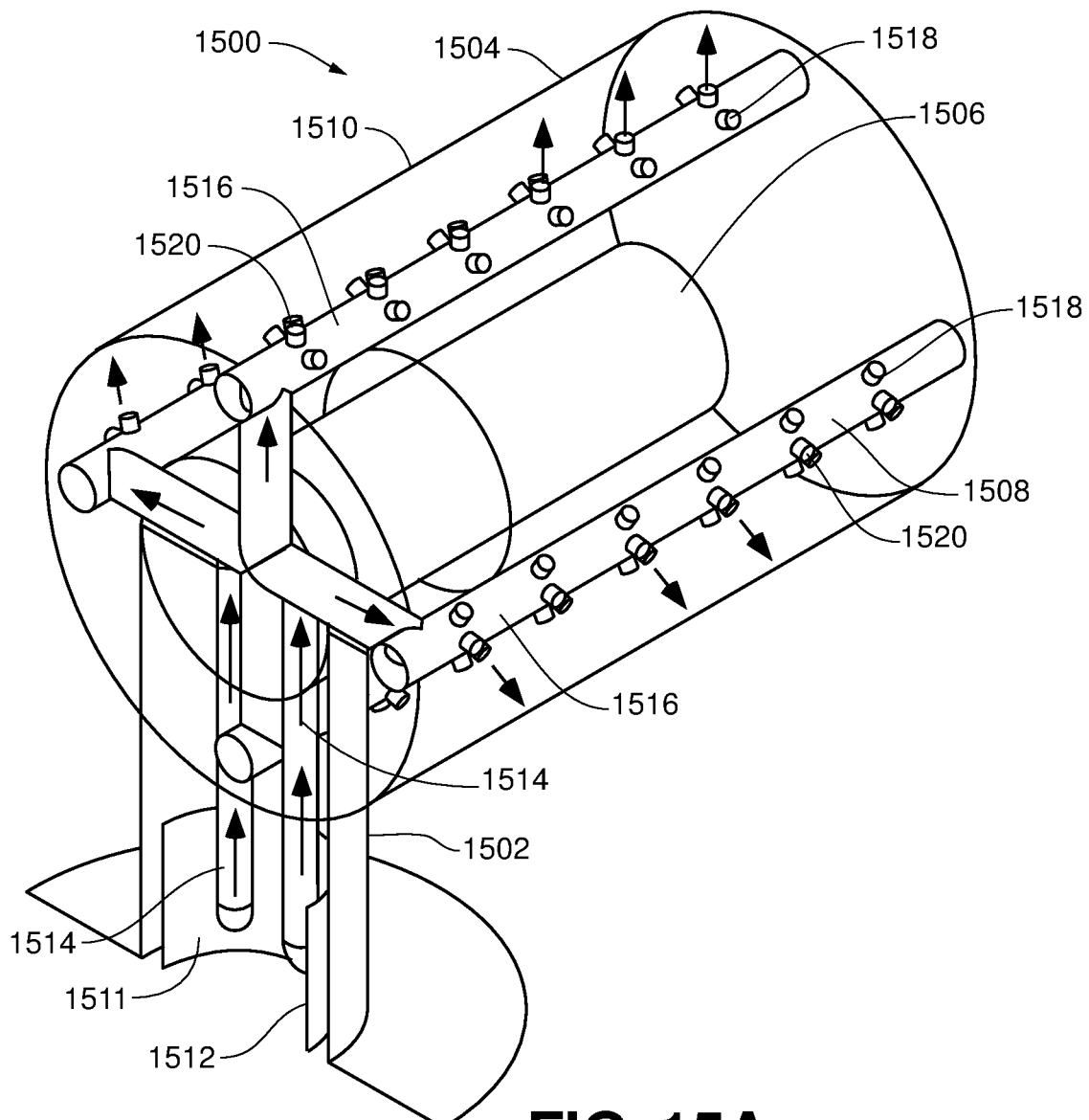
FIG. 15A is a partially hidden, perspective view of an integrated cleaning system for use with a screen intake assembly according to embodiment of the present invention.
Figure 15B:
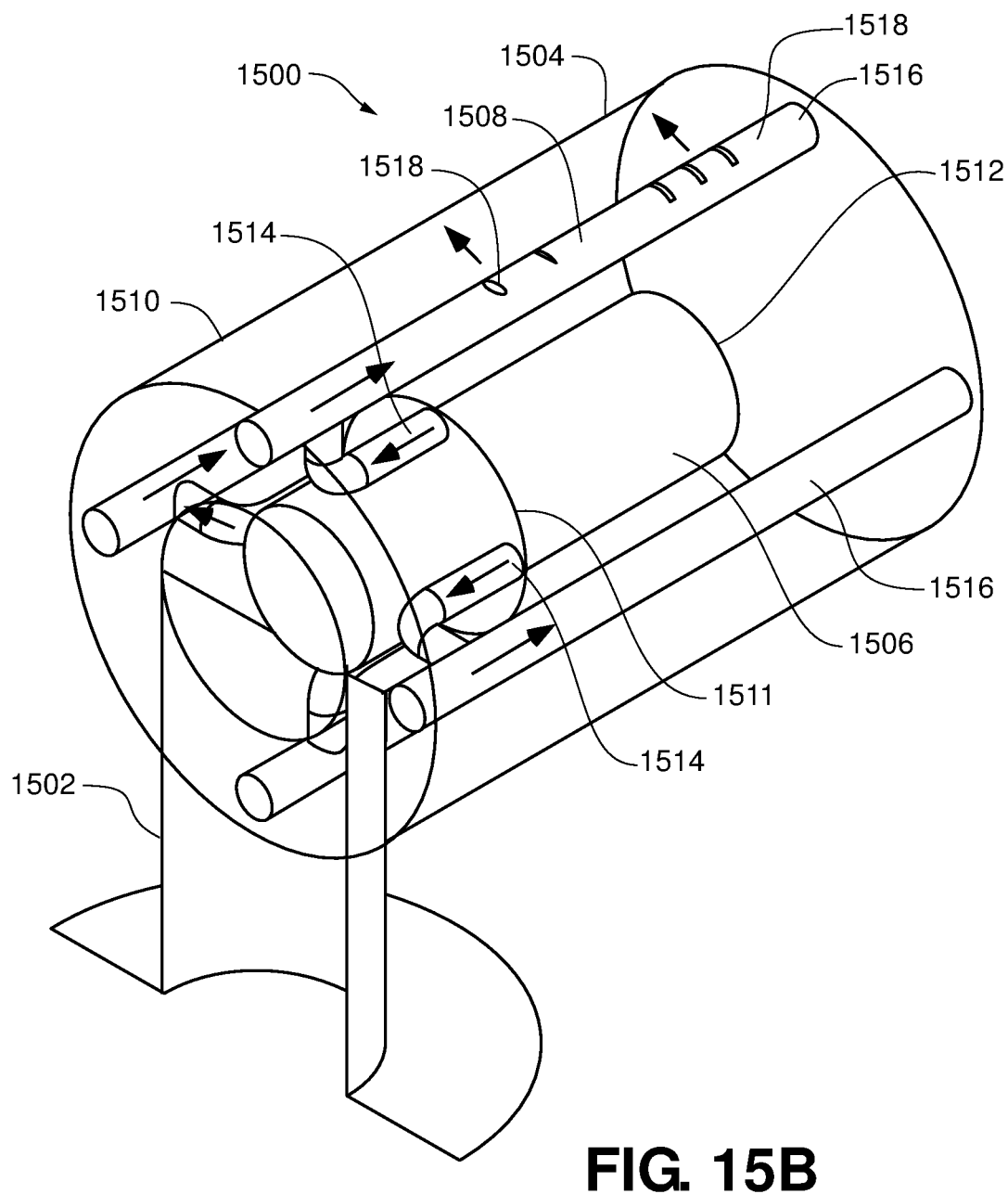
FIG. 15B is a partially hidden, perspective view of an integrated cleaning system for use with a screen intake assembly according to embodiment of the present invention.

Yet another variation of a screen intake assembly 1500 of the present invention is shown in FIGS. 15A and 15B. As illustrated, screen intake assembly 1500 includes a central tee-portion 1502 and a screen portion 1504. While only a single screen portion 1504 is shown, it will be understood that additional screen portions can be operably connected to the central tee-portion 1502 based upon fluid flow requirements. The screen intake assembly 1500 includes an internal flow modifier assembly 1506 and an integrated self-cleaning system 1508. Generally, the internal flow modifier assembly 1506 is configured to promote desirable flow conditions through a screen filter 1510 on one or both of the central tee-portion 1502 and the screen portion 1504. As seen in FIG. 15A, the integrated self-cleaning system 1508 can comprise an intake scoop 1511 that is operably connected to a flow modifier conduit 1512 that is positioned within the central tee-portion 1502. One or more cleaning inlet pipes 1514 can be fluidly connected to the intake scoop 1511 such that a portion of fluid flowing between the intake scoop 1511 and the central tee-portion 1502 is directed into the cleaning inlet pipes 1514. The cleaning inlet pipes 1514 are fluidly connected to one or more cleaning pipes 1516 that are positioned axially and radially along a length defined by one or or both of the central tee-portion 1502 and screen portion 1504. As shown, the one or more cleaning pipes 1516 can be positioned within the screen intake assembly 1500 and in proximity to an interior surface of the screen filter 1510. Alternatively, the one or more cleaning pipes 1516 can be positioned outside the screen intake assembly 1500 and in proximity to an exterior surface of the screen filter 1510. Each cleaning pipe 1516 generally includes a plurality of spaced apart apertures 1518, slots or perforations. In some instances, a nozzle 1520 can be operably mounted within each aperture 1518 as shown in FIG. 15A. The fluid flow is directed through the cleaning inlet pipes 1514, into the cleaning pipes 1516 and out the apertures 1518/nozzles 1520. The fluid flow out of the apertures 1518/nozzles 1520 can be directed against the screen filter 1510 or along the screen filter 1510 to dislodge and/or inhibit the attachment of any contaminants. Furthermore, the integrated self-cleaning system 1508 is a passive system requiring no external power source and no moving parts that could require ongoing maintenance. In a version of the integrated self-cleaning system 1508 as shown in FIG. 15B, the intake scoop 1511 can be located within the internal flow modifier assembly 1506 at a location internal to the screen portion 1504 as opposed to the central tee-portion 1502.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A screen intake assembly comprising:
a central manifold including a lower outlet portion and tee-section;
a pair of screen sections fluidly connected on opposed sides of the tee-section; and
a central screen section substantially extending across the tee-section,
wherein the tee-section includes at least two external flanged manifold walls at opposed ends of the the central screen section and at least one external support rib mounted between the at least two circumferential flanged manifold walls and extending across the central screen section, said at least one external support rib arranged transversely to a central axis defined by the lower outlet portion, the at least two external flanged manifold wall and the at least one external support rib extend radially outwardly beyond a screen surface defined by the pair of screen sections and the central screen section.

2. The screen intake assembly of claim 1, wherein the central screen section extends across the central axis defined by the lower outlet portion.

3. The screen intake assembly of claim 1, wherein the lower outlet portion includes a fluid intake portion.

4. The screen intake assembly of claim 3, wherein the fluid intake portion can be selected from a lower screen portion, a plurality of slots and a plurality of apertures.

5. The screen intake assembly of claim 1, wherein the central manifold further comprises an internal flow modifier internal to the pair of screen sections and the central screen section.

6. The screen intake assembly of claim 5, wherein the internal flow modifier comprises:
a perforated flow modifier pipe;
an internal flow modifier pipe within the perforated flow modifier pipe; and
at least one radial support member mounted between the perforated flow modifier pipe and the internal flow modifier pipe.

7. The screen intake assembly of claim 6, further comprising:
at least one divider plate mounted within the lower outlet portion.

8. The screen intake assembly of claim 5 wherein a plurality of spaced apart circumferential support members are mounted over the internal flow modifier, each spaced apart circumferential support member further comprising a plurality of flow apertures.

9. The screen intake assembly of claim 8, wherein the plurality of flow apertures in the plurality of spaced apart radial support members are positioned along a shared radial axis.

10. The screen intake assembly of claim 1, wherein each of the pair of screen sections, comprises:
at least two screen portions arranged along a screen axis transverse to the central axis such that a screen length along the screen axis is defined by the sum of the length of each screen portion and the central screen section.

11. The screen intake assembly of claim 1, further comprising:
an expandable internal flow member within the pair of screen sections and the central screen section, and
wherein each of the pair of screen sections includes at least two screen portions arranged along a screen axis transverse to the central axis such that a screen length along the screen axis is defined by the sum of the length of each screen portion and the central screen section.

12. The screen intake assembly of claim 1, wherein the pair of screen sections, the central screen section and the tee-section define a non-circular cross-section along a screen axis transverse to the central axis.

13. The screen intake assembly of claim 12, wherein the pair of screen sections, the central screen section and the tee-section define a screen height and a screen width, wherein the screen width is greater than the screen height.

14. The screen intake assembly of claim 1, wherein the pair of screen section and the central screen section are defined by a first length of v-shaped wire continually wrapped and welded to a support member to define a first wire gap and a first wire height.

15. The screen intake assembly of claim 1, wherein the pair of screen sections and the central screen section are defined by a first length of v-shaped wire continually wrapped and welded to a support member to define a first wire gap and a first wire height, and
wherein the pair of screen sections and the central screen section further comprise a second length of v-shaped wire continually wrapped and welded to the support member such that the second length of v-shaped wire is positioned between adjacent wraps of the first length of v-shaped wire, the second length of v-shaped wire having a second wire height less than the first wire height such that a second wire gap is defined between the second length of v-shaped wire and each adjacent first length of v-shaped wire, said second wire gap being less than the first wire gap.

16. The screen intake assembly of claim 1, wherein the central manifold further comprises an oscillator assembly inducing vibrations on each of the pair of screen sections and the central screen section.

17. The screen intake assembly of claim 16, wherein the oscillator assembly comprises a remote power source.

18. The screen intake assembly of claim 16, wherein fluid flow through the central manifold is converted to rotational energy with a turbine or propeller style assembly to power the oscillator assembly.

19. The screen intake assembly of claim 16, wherein the central manifold further comprises an internal flow modifier internal to the pair of screen sections and the central screen section and wherein the oscillator assembly further comprises a flow-through oscillator mounted between the internal flow modifier and the pair of screen sections and the central screen section.

20. The screen intake assembly of claim 1, further comprising:
   an internal air burst system comprising:
      a plurality of air burst pipes radially arranged about a central screen axis defined by the pair of screen sections and the central screen section; and
      a remote source of pressurized air,
   wherein the pressurized air is radially, sequentially delivered through the plurality of air burst pipes.

* * * * *